United States Patent
Kim et al.

(10) Patent No.: US 10,542,414 B2
(45) Date of Patent: Jan. 21, 2020

(54) METHOD FOR PERFORMING DEVICE-TO-DEVICE DIRECT COMMUNICATION IN WIRELESS COMMUNICATION SYSTEM AND DEVICE THEREFOR

(71) Applicant: LG ELECTRONICS INC., Seoul (KR)

(72) Inventors: Taehun Kim, Seoul (KR); Laeyoung Kim, Seoul (KR); Sungduck Chun, Seoul (KR); Jaehyun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/762,696

(22) PCT Filed: Sep. 26, 2016

(86) PCT No.: PCT/KR2016/010771
§ 371 (c)(1),
(2) Date: Mar. 23, 2018

(87) PCT Pub. No.: WO2017/052335
PCT Pub. Date: Mar. 30, 2017

(65) Prior Publication Data
US 2018/0295497 A1    Oct. 11, 2018

Related U.S. Application Data

(60) Provisional application No. 62/232,462, filed on Sep. 25, 2015.

(51) Int. Cl.
*H04W 8/08* (2009.01)
*H04W 88/04* (2009.01)
*H04W 92/18* (2009.01)

(52) U.S. Cl.
CPC .............. *H04W 8/08* (2013.01); *H04W 88/04* (2013.01); *H04W 92/18* (2013.01)

(58) Field of Classification Search
CPC ..... H04W 60/04; H04W 68/02; H04W 88/04; H04W 8/08; H04W 92/18
(Continued)

(56) References Cited

U.S. PATENT DOCUMENTS

| | | | | |
|---|---|---|---|---|
| 2013/0100929 A1* | 4/2013 | Liu | ...... | H04W 36/00 370/331 |
| 2013/0183971 A1* | 7/2013 | Tamaki | ...... | H04W 36/0061 455/436 |

(Continued)

FOREIGN PATENT DOCUMENTS

WO    2015142132 A1    9/2015

OTHER PUBLICATIONS

R2-153351: 3GPP TSG-RAN WG2 #91, Beijing, China, Aug. 24-28, 2015, Kyocera, "Consideration of initiation of ProSe UE-to-Network Relays," Discussion and decision, pp. 1-7.

(Continued)

*Primary Examiner* — Robert J Lopata
(74) *Attorney, Agent, or Firm* — Dentons US LLP

(57) ABSTRACT

Disclosed are a direct communication method and ProSe-enabled UE, the direct communication method receiving an identifier of MME supporting relay UE from the relay UE in which a direct connection to remote UE is established, and transmitting, to a base station supporting the relay UE, a TAU request message for requesting the MME supporting the relay UE to manage context information of the remote UE together, and the identifier of MME.

10 Claims, 15 Drawing Sheets

(58) Field of Classification Search
USPC .......................................................... 370/328
See application file for complete search history.

(56) References Cited

U.S. PATENT DOCUMENTS

| | | | |
|---|---|---|---|
| 2014/0192739 A1 | 7/2014 | Liao | |
| 2014/0226559 A1* | 8/2014 | Jactat | H04W 36/0055 370/315 |
| 2014/0349570 A1* | 11/2014 | Pan | H04W 60/00 455/11.1 |
| 2016/0142880 A1* | 5/2016 | Talluri | H04W 4/025 455/456.1 |

OTHER PUBLICATIONS

R2-153461: 3GPP TSG-RAN WG2 #91, Beijing, P.R. China, Aug. 24-28, 2015, Ericsson, "Management of the PC5 link between the Relay UE and the Remote UE," Discussion, Decision, pp. 1-5.
S2-152367: SA WG2 Meeting #10, Jul. 6-10, 2015, Dubrovnik, Croatia, Samsung, "Clarification on ProSe UE-NW relay," pp. 1-4.
International Search Report from PCT/KR2016/010771, dated Dec. 29, 2016.
Written Opinion of the ISA from PCT/KR2016/010771, dated Dec. 29, 2016.

* cited by examiner (a) UE-1 and UE-2 camp on different eNodeBs (b) UE-1 and UE-2 camp on the same eNodeB

METHOD FOR PERFORMING DEVICE-TO-DEVICE DIRECT COMMUNICATION IN WIRELESS COMMUNICATION SYSTEM AND DEVICE THEREFOR

This application is a 35 use § 371 national stage entry of international application no. PCT/KR2016/010771 filed on Sep. 26, 2016, and claims priority to U.S. provisional application No. 62/232,462 filed on Sep. 25, 2015, all of which are hereby incorporated by reference in their entireties as if fully set forth herein.

TECHNICAL FIELD

The present invention relates to a wireless communication system, and more particularly, to a method and apparatus for efficiently managing a context through device-to-device (D2D) direct communication in a D2D direct communication (e.g., ProSe communication) environment.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

DISCLOSURE OF THE INVENTION

Technical Task

An object of the present invention is to improve a method performed by a network entity for supporting D2D direct communication in a ProSe communication process.

Another object of the present invention is to reduce power consumption by establishing a relationship among a plurality of coexisting user equipments.

A further object of the present invention is to achieve efficient mobility management by controlling contexts of user equipments.

The technical problems solved by the present invention are not limited to the above technical problems and other technical problems which are not described herein will become apparent to those skilled in the art from the following description.

Technical Solutions

To achieve these objects and other advantages, in an aspect of the present invention, provided herein is a method for performing direct communication, including: receiving an identifier of a first mobility management entity (MME), which is an MME supporting a relay user equipment (UE), from the relay UE having a direct connection with a remote UE; and transmitting a tracking area update (TAU) request message for requesting the first MME supporting the relay UE to manage context information of the remote UE together and the identifier of the first MME to an evolved node B (eNB) supporting the relay UE.

The identifier of the first MME may be received through a PC5 message from the relay UE, and a non-access stratum (NAS) layer of the remote UE may forward the identifier of the first MME to an access stratum (AS) layer. The TAU request message and the identifier of the first MME may be transmitted to the eNB through a radio resource control (RRC) message, and the eNB may identify the first MME to which the TAU request message will be forwarded using the identifier of the first MME.

Receiving may include receiving, from the relay UE, a system architecture evolution (SAE) temporary mobile subscriber identity (S-TMSI) of the relay UE instead of the identifier of the first MME. A non-access stratum (NAS) layer of the remote UE forwards the identifier of the first MME or the S-TMSI of the relay UE to an access stratum (AS) layer, and the S-TMSI of the relay UE may be forwarded to the eNB through a radio resource control (RRC) message.

Receiving may include receiving an identifier (ID) of a public land mobile network in which the relay UE is currently registered and an ID of a serving cell of the relay UE together with the identifier of the first MME, and the remote UE may perform a PLMN alignment process and a cell alignment process using the PLMN ID and the serving cell ID before transmitting the TAU request message The relay UE and the remote UE may form a prescribed UE group where mobility is managed together. In this case, the relay UE may be a representative UE of the UE group, and the remote UE may be a subordinary UE of the UE group.

If an MME is changed while a TAU procedure for the relay UE is performed, context information of the relay UE and the context information of the remote UE may be transmitted together from a previous MME to a new MME.

When paging of the remote UE is detected, the relay UE may forward a paging message to the remote UE through the direct connection with the remote UE.

When the TAU request message is received, the first MME may obtain the context information of the remote UE from a second MME, which is an MME supporting the remote UE.

In another aspect of the present invention, provided herein is a relay user equipment (UE), including: a transmitter; a receiver; and a processor connected to the transmitter and the receiver. In this case, the processor may be configured to receive an identifier of a first mobility management entity (MME), which is an MME supporting the relay UE, from the relay UE having a direct connection with the remote UE and transmit a tracking area update (TAU) request message for requesting the first MME supporting the relay UE to manage context information of the remote UE together and the identifier of the first MME to an evolved node B (eNB) supporting the relay UE.

Advantageous Effects

As is apparent from the above description, the embodiments of the present invention have the following effects.

First, a method for supporting D2D direct communication can be improved, thereby preventing network entities from wasting radio resources.

Second, when a user uses a plurality of UEs, power consumption of the UEs can be efficiently improved.

Third, it is possible to reduce signaling overhead required for UE mobility management by controlling contexts between network entities.

The effects of the present invention are not limited to the above-described effects and other effects which are not described herein may be derived by those skilled in the art from the following description of the embodiments of the present invention. That is, effects which are not intended by the present invention may be derived by those skilled in the art from the embodiments of the present invention.

DESCRIPTION OF DRAWINGS

The accompanying drawings, which are included to provide a further understanding of the invention, illustrate embodiments of the invention and together with the description serve to explain the principle of the invention. The technical features of the present invention are not limited to specific drawings and the features shown in the drawings are combined to construct a new embodiment. Reference numerals of the drawings mean structural elements.

BEST MODE FOR INVENTION

Figure 1:
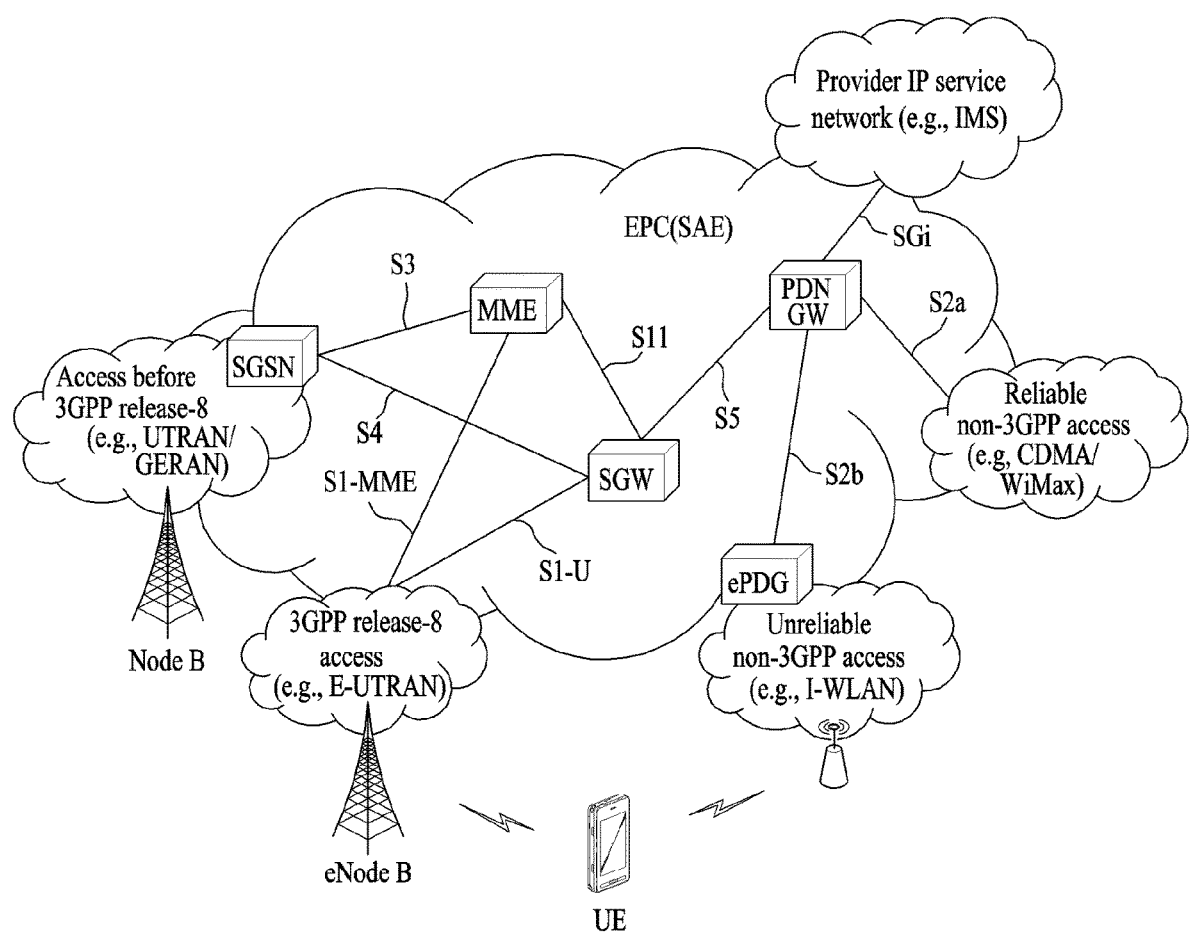
FIG. 1 is a diagram illustrating a brief structure of an EPS (evolved packet system) that includes an EPC (evolved packet core)

Although the terms used in the present invention are selected from generally known and used terms, terms used herein may be varied depending on operator's intention or customs in the art, appearance of new technology, or the like. In addition, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meanings of each term lying within.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments or may be replaced with those of the other embodiments as necessary.

In describing the present invention, if it is determined that the detailed description of a related known function or construction renders the scope of the present invention unnecessarily ambiguous, the detailed description thereof will be omitted.

In the entire specification, when a certain portion "comprises or includes" a certain component, this indicates that the other components are not excluded and may be further included unless specially described otherwise. The terms "unit", "-or/er" and "module" described in the specification indicate a unit for processing at least one function or operation, which may be implemented by hardware, software or a combination thereof. The words "a or an", "one", "the" and words related thereto may be used to include both a singular expression and a plural expression unless the context describing the present invention (particularly, the context of the following claims) clearly indicates otherwise.

The embodiments of the present invention can be supported by the standard documents disclosed in any one of wireless access systems, such as an IEEE 802.xx system, a 3rd Generation Partnership Project (3GPP) system, a 3GPP Long Term Evolution (LTE)/LTE-Advanced (LTE-A) system, and a 3GPP2 system. That is, the steps or portions, which are not described in order to make the technical spirit of the present invention clear, may be supported by the above documents.

In addition, all the terms disclosed in the present document may be described by the above standard documents. In particular, the embodiments of the present invention may be supported by at least one of P802.16e-2004, P802.16e-2005, P802.16.1, P802.16p and P802.16.1b documents, which are the standard documents of the IEEE 802.16 system.

Hereinafter, the preferred embodiments of the present invention will be described with reference to the accompanying drawings. It is to be understood that the detailed description which will be disclosed along with the accompanying drawings is intended to describe the exemplary embodiments of the present invention and is not intended to describe a unique embodiment which the present invention can be carried out.

It should be noted that specific terms disclosed in the present invention are proposed for convenience of description and better understanding of the present invention, and the use of these specific terms may be changed to another format within the technical scope or spirit of the present invention.

Terms used in the specification are defined as follows.
UMTS (Universal Mobile Telecommunications System):
a GSM (Global System for Mobile Communication)

based third generation mobile communication technology developed by the 3GPP.

EPS (Evolved Packet System): a network system that includes an EPC (Evolved Packet Core) which is an IP (Internet Protocol) based packet switched core network and an access network such as LTE and UTRAN. This system is the network of an evolved version of the UMTS.

NodeB: a base station of GERAN/UTRAN. This base station is installed outdoor and its coverage has a scale of a macro cell.

eNodeB: a base station of LTE. This base station is installed outdoor and its coverage has a scale of a macro cell.

UE (User Equipment): the UE may be referred to as terminal, ME (Mobile Equipment), MS (Mobile Station), etc. Also, the UE may be a portable device such as a notebook computer, a cellular phone, a PDA (Personal Digital Assistant), a smart phone, and a multimedia device. Alternatively, the UE may be a non-portable device such as a PC (Personal Computer) and a vehicle mounted device. The term "UE", as used in relation to MTC, can refer to an MTC device.

HNB (Home NodeB): a base station of UMTS network. This base station is installed indoor and its coverage has a scale of a micro cell.

HeNB (Home eNodeB): a base station of an EPS network. This base station is installed indoor and its coverage has a scale of a micro cell.

MME (Mobility Management Entity): a network node of an EPS network, which performs mobility management (MM) and session management (SM).

PDN-GW (Packet Data Network-Gateway)/PGW/P-GW: a network node of an EPS network, which performs UE IP address allocation, packet screening and filtering, charging data collection, etc.

SGW (Serving Gateway/S-GW: a network node of an EPS network, which performs mobility anchor, packet routing, idle-mode packet buffering, and triggering of an MME's UE paging.

PCRF (Policy and Charging Rule Function): a network node of an EPS network, which performs a policy decision to dynamically apply different QoS and charging policies for each service flow.

OMA DM (Open Mobile Alliance Device Management): a protocol designed to manage mobile devices such as a cell phone, a PDA, and a laptop computer, which performs functions such as device configuration, firmware upgrade, error report, and the like.

OAM (Operation Administration and Maintenance): a set of network management functions, which provides network error display, performance information, data, and management functions.

NAS (Non-Access Stratum): a higher stratum of a control plane between a UE and MME. As a functional layer for exchanging signaling and traffic messages between a UE and core network in LTE/UMTS protocol stack, the NAS supports UE mobility, a session management procedure for establishing and maintaining an IP connection between a UE and PDN GW, and IP address management.

AS (Access-Stratum): the AS includes a protocol stack between a UE and a radio (or access) network, which manages transmission of data and network control signals.

NAS configuration MO (Management Object): the NAS configuration MO is a management object (MO) used to configure parameters related to NAS functionality for a UE.

PDN (Packet Data Network): a network in which a server supporting a specific service (e.g., a Multimedia Messaging Service (MMS) server, a Wireless Application Protocol (WAP) server, etc.) is located.

PDN connection: a logical connection between a UE and a PDN, represented as one IP address (one IPv4 address and/or one IPv6 prefix).

APN (Access Point Name): a character string for indicating or identifying PDN. To access a requested service or network, a connection to a specific P-GW is required. The APN means a name (character string) predefined in a network to search for the corresponding P-GW (for example, it may be defined as internet.mnc012.mcc345.gprs).

RAN (Radio Access Network): a unit including a Node B, an eNode B, and a Radio Network Controller (RNC) for controlling the Node B and the eNode B in a 3GPP network, which is present between UEs and provides a connection to a core network.

HLR (Home Location Register)/HSS (Home Subscriber Server): a database having subscriber information in a 3GPP network. The HSS can perform functions such as configuration storage, identity management, and user state storage.

PLMN (Public Land Mobile Network): a network configured for the purpose of providing mobile communication services to individuals. This network can be configured per operator.

ANDSF (Access Network Discovery and Selection Function): This is one of network entities for providing a policy for discovering and selecting an access that can be used by a UE on an operator basis.

Proximity Services (or ProSe Service or Proximity-based Service): a service that enables discovery between physically proximate devices, and mutual direct communication/communication through a base station/communication through the third party. At this time, user plane data are exchanged through a direct data path without through a 3GPP core network (for example, EPC).

ProSe Communication: communication between two or more ProSe-enabled UEs in proximity by means of a ProSe Communication path. Unless explicitly stated otherwise, the term "ProSe Communication" refers to any/all of the following: ProSe E-UTRA Communication, ProSe-assisted WLAN direct communication between two UEs, ProSe Group Communication and ProSe Broadcast Communication.

ProSe E-UTRA Communication: ProSe Communication using a ProSe E-UTRA Communication path.

ProSe-assisted WLAN direct communication: ProSe Communication using a ProSe-assisted WLAN direct communication path.

ProSe Communication path: communication path supporting ProSe Communication. The ProSe E-UTRA Communication path could be established between the ProSe-enabled UEs using E-UTRA, or routed via local eNB(s). The ProSe-assisted WLAN direct communication path may be established directly between the ProSe-enabled UEs using WLAN.

EPC Path (or infrastructure data path): the user plane communication path through EPC.

ProSe Discovery: a process that identifies that a UE that is ProSe-enabled is in proximity of another, using E-UTRA.

ProSe Group Communication: one-to-many ProSe Communication, between more than two ProSe-enabled UEs in proximity, by means of a common communication path established between the ProSe-enabled UEs.

ProSe UE-to-Network Relay: is a form of relay in which a ProSe-enabled Public Safety UE acts as a communication relay between a ProSe-enabled Public Safety UE and the ProSe-enabled network using E-UTRA.

Remote UE: This is a ProSe-enabled Public Safety UE that is connected to an EPC network through a ProSe UE-to-network relay instead of being served by an E-UTRAN in UE-to-Network Relay operation. That is, a PDN connection is provided to the remote UE.

ProSe-enabled Network: a network that supports ProSe Discovery, ProSe Communication and/or ProSe-assisted WLAN direct communication. Hereinafter, the ProSe-enabled Network may simply be referred to as a network.

ProSe-enabled UE: a UE that supports ProSe Discovery, ProSe Communication and/or ProSe-assisted WLAN direct communication. Hereinafter, the ProSe-enabled UE and the ProSe-enabled Public Safety UE may be referred to as UE.

Proximity: proximity is determined ("a UE is in proximity of another UE") when given proximity criteria are fulfilled. Proximity criteria can be different for discovery and communication.

1. Evolved Packet Core (EPC)

FIG. 1 is a schematic diagram showing the structure of an evolved packet system (EPS) including an evolved packet core (EPC).

The EPC is a core element of system architecture evolution (SAE) for improving performance of 3GPP technology. SAE corresponds to a research project for determining a network structure supporting mobility between various types of networks. For example, SAE aims to provide an optimized packet-based system for supporting various radio access technologies and providing an enhanced data transmission capability.

Specifically, the EPC is a core network of an IP mobile communication system for 3GPP LTE and can support real-time and non-real-time packet-based services. In conventional mobile communication systems (i.e. second-generation or third-generation mobile communication systems), functions of a core network are implemented through a circuit-switched (CS) sub-domain for voice and a packet-switched (PS) sub-domain for data. However, in a 3GPP LTE system which is evolved from the third generation communication system, CS and PS sub-domains are unified into one IP domain. That is, in 3GPP LTE, connection of terminals having IP capability can be established through an IP-based business station (e.g., an eNodeB (evolved Node B)), EPC, and an application domain (e.g., IMS). That is, the EPC is an essential structure for end-to-end IP services.

The EPC may include various components. FIG. 1 shows some of the components, namely, a serving gateway (SGW), a packet data network gateway (PDN GW), a mobility management entity (MME), a serving GPRS (general packet radio service) supporting node (SGSN) and an enhanced packet data gateway (ePDG).

The SGW operates as a boundary point between a radio access network (RAN) and a core network and maintains a data path between an eNodeB and the PDN GW. When. When a terminal moves over an area served by an eNodeB, the SGW functions as a local mobility anchor point. That is, packets. That is, packets may be routed through the SGW for mobility in an evolved UMTS terrestrial radio access network (E-UTRAN) defined after 3GPP release-8. In addition, the SGW may serve as an anchor point for mobility of another 3GPP network (a RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an unreliable network such as an interworking wireless local area network (I-WLAN) and a reliable network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions for supporting access of a UE for network connection, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., a GPRS network).

The ePDG serves as a security node for a non-3GPP network (e.g., an I-WLAN, a Wi-Fi hotspot, etc.).

As described above with reference to FIG. 1, a terminal having IP capabilities may access an IP service network (e.g., an IMS) provided by an operator via various elements in the EPC not only based on 3GPP access but also on non-3GPP access.

Additionally, FIG. 1 shows various reference points (e.g. S1-U, S1-MME, etc.). In 3GPP, a conceptual link connecting two functions of different functional entities of an E-UTRAN and an EPC is defined as a reference point. Table 1 is a list of the reference points shown in FIG. 1. Various reference points may be present in addition to the reference points in Table 1 according to network structures.

TABLE 1

| Reference point | Description |
| --- | --- |
| S1-MME | Reference point for the control plane protocol between E-UTRAN and MME |
| S1-U | Reference point between E-UTRAN and Serving GW for the per bearer user plane tunneling and inter eNodeB path switching during handover |
| S3 | It enables user and bearer information exchange for inter 3GPP access network mobility in idle and/or active state. This reference point can be used intra-PLMN or inter-PLMN (e.g. in the case of Inter-PLMN HO). |
| S4 | It provides related control and mobility support between GPRS Core and the 3GPP Anchor function of Serving GW. In addition, if Direct Tunnel is not established, it provides the user plane tunneling. |
| S5 | It provides user plane tunneling and tunnel management |

TABLE 1-continued

| Reference point | Description |
| --- | --- |
| | between Serving GW and PDN GW. It is used for Serving GW relocation due to UE mobility and if the Serving GW needs to connect to a non-collocated PDN GW for the required PDN connectivity. |
| S11 | Reference point between an MME and an SGW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

Among the reference points shown in FIG. 1, S2a and S2b correspond to non-3GPP interfaces. S2a is a reference point which provides reliable non-3GPP access and related control and mobility support between PDN GWs to a user plane. S2b is a reference point which provides related control and mobility support between the ePDG and the PDN GW to the user plane.

Figure 2:
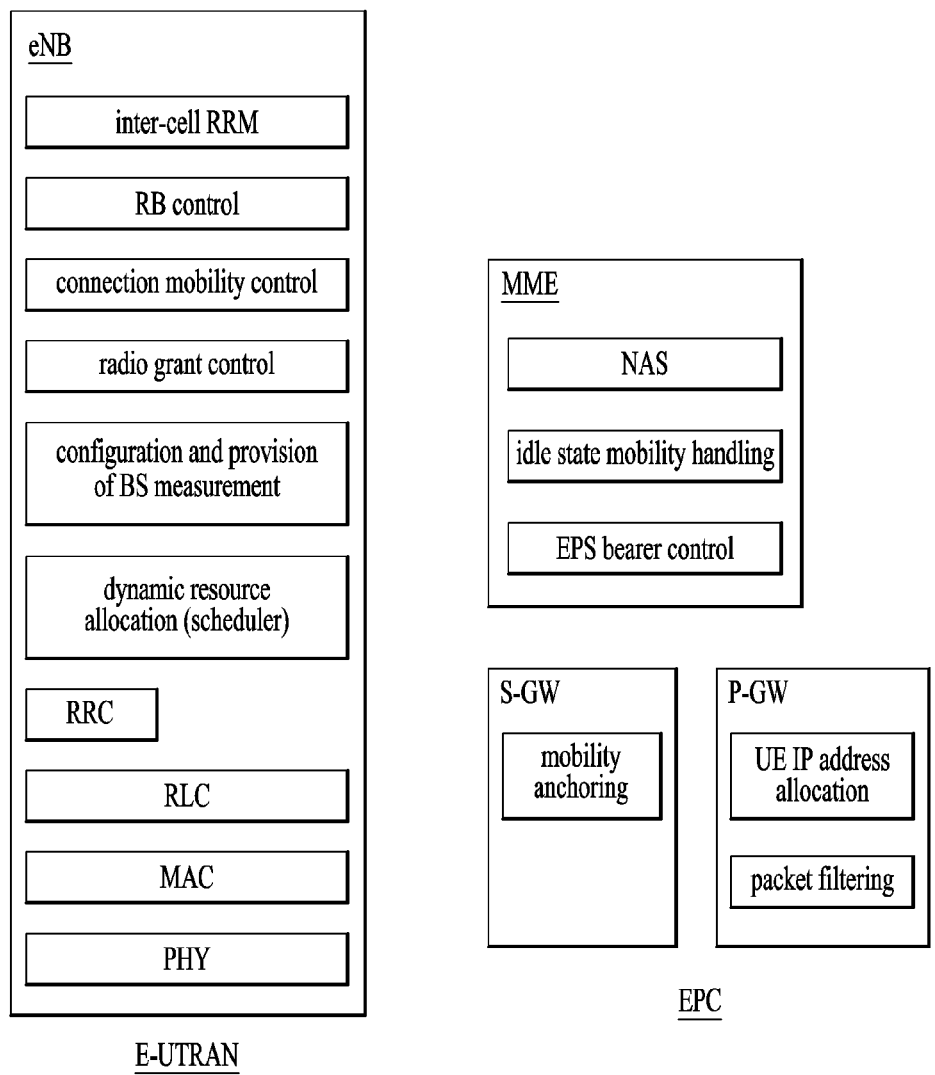
FIG. 2 is an exemplary diagram illustrating an architecture of a general E-UTRAN and a general EPC.

FIG. 2 is a diagram exemplarily illustrating architectures of a typical E-UTRAN and EPC.

As shown in the figure, while radio resource control (RRC) connection is activated, an eNodeB may perform routing to a gateway, scheduling transmission of a paging message, scheduling and transmission of a broadcast channel (BCH), dynamic allocation of resources to a UE on uplink and downlink, configuration and provision of eNodeB measurement, radio bearer control, radio admission control, and connection mobility control. In the EPC, paging generation, LTE_IDLE state management, ciphering of the user plane, SAE bearer control, and ciphering and integrity protection of NAS signaling.

Figure 3:
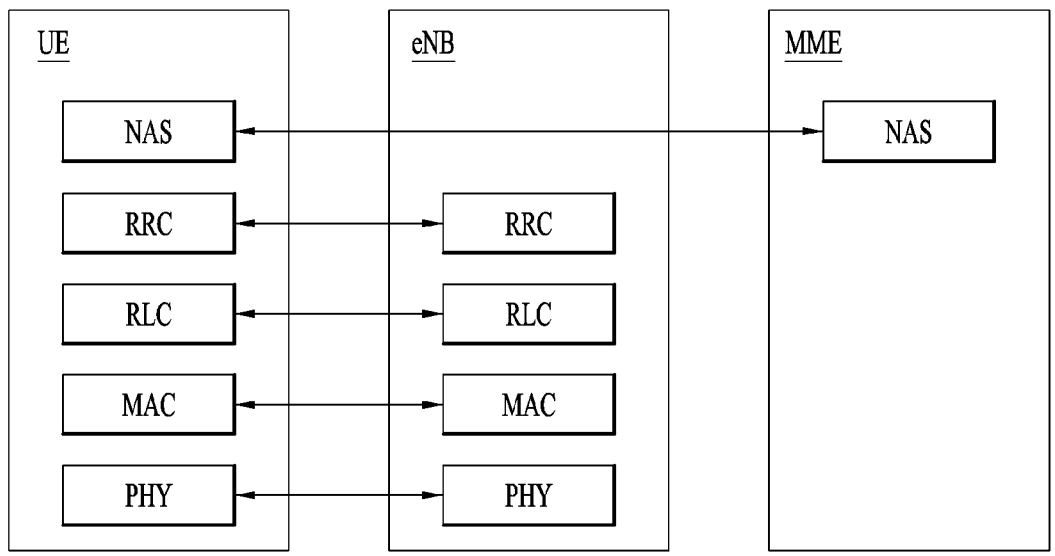
FIG. 3 is an exemplary diagram illustrating a structure of a radio interface protocol on a control plane.
Figure 4:
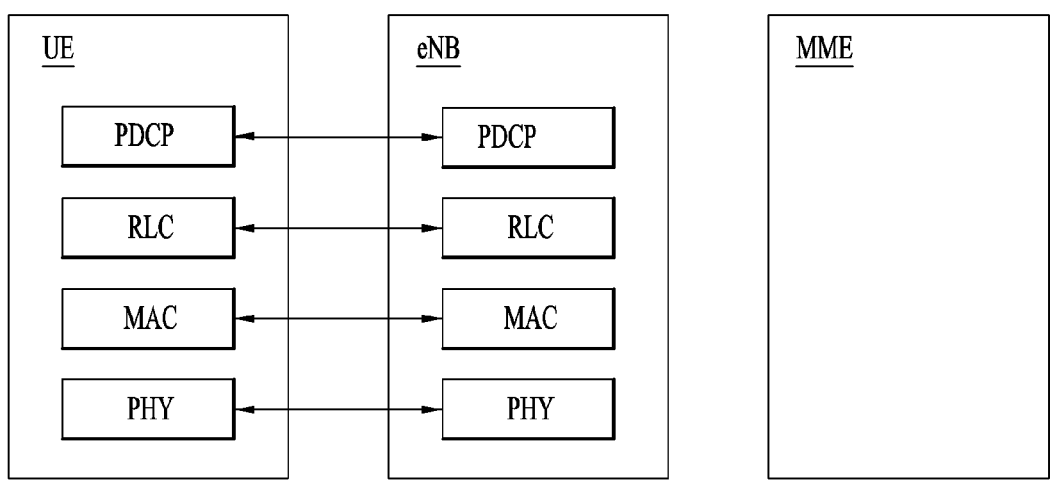
FIG. 4 is an exemplary diagram illustrating a structure of a radio interface protocol on a user plane.

FIG. 3 is a diagram exemplarily illustrating the structure of a radio interface protocol in a control plane between a UE and a base station, and FIG. 4 is a diagram exemplarily illustrating the structure of a radio interface protocol in a user plane between the UE and the base station.

The radio interface protocol is based on the 3GPP wireless access network standard. The radio interface protocol horizontally includes a physical layer, a data link layer, and a networking layer. The radio interface protocol is divided into a user plane for transmission of data information and a control plane for delivering control signaling which are arranged vertically.

The protocol layers may be classified into a first layer (L1), a second layer (L2), and a third layer (L3) based on the three sublayers of the open system interconnection (OSI) model that is well known in the communication system.

Hereinafter, description will be given of a radio protocol in the control plane shown in FIG. 3 and a radio protocol in the user plane shown in FIG. 4.

The physical layer, which is the first layer, provides an information transfer service using a physical channel. The physical channel layer is connected to a medium access control (MAC) layer, which is a higher layer of the physical layer, through a transport channel Data is transferred between the physical layer and the MAC layer through the transport channel Transfer of data between different physical layers, i.e., a physical layer of a transmitter and a physical layer of a receiver is performed through the physical channel.

The physical channel consists of a plurality of subframes in the time domain and a plurality of subcarriers in the frequency domain. One subframe consists of a plurality of OFDM symbols in the time domain and a plurality of subcarriers. One subframe consists of a plurality of resource blocks. One resource block consists of a plurality of OFDM symbols and a plurality of subcarriers. A Transmission Time Interval (TTI), a unit time for data transmission, is 1 ms, which corresponds to one subframe.

According to 3GPP LTE, the physical channels present in the physical layers of the transmitter and the receiver may be divided into data channels corresponding to Physical Downlink Shared Channel (PDSCH) and Physical Uplink Shared Channel (PUSCH) and control channels corresponding to Physical Downlink Control Channel (PDCCH), Physical Control Format Indicator Channel (PCFICH), Physical Hybrid-ARQ Indicator Channel (PHICH) and Physical Uplink Control Channel (PUCCH).

The second layer includes various layers. First, the MAC layer in the second layer serves to map various logical channels to various transport channels and also serves to map various logical channels to one transport channel. The MAC layer is connected with an RLC layer, which is a higher layer, through a logical channel. The logical channel is broadly divided into a control channel for transmission of information of the control plane and a traffic channel for transmission of information of the user plane according to the types of transmitted information.

The radio link control (RLC) layer in the second layer serves to segment and concatenate data received from a higher layer to adjust the size of data such that the size is suitable for a lower layer to transmit the data in a radio interval.

The Packet Data Convergence Protocol (PDCP) layer in the second layer performs a header compression function of reducing the size of an IP packet header which has a relatively large size and contains unnecessary control information, in order to efficiently transmit an IP packet such as an IPv4 or IPv6 packet in a radio interval having a narrow bandwidth. In addition, in LTE, the PDCP layer also performs a security function, which consists of ciphering for preventing a third party from monitoring data and integrity protection for preventing data manipulation by a third party.

The Radio Resource Control (RRC) layer, which is located at the uppermost part of the third layer, is defined only in the control plane, and serves to configure radio bearers (RBs) and control a logical channel, a transport channel, and a physical channel in relation to reconfiguration and release operations. The RB represents a service provided by the second layer to ensure data transfer between a UE and the E-UTRAN.

If an RRC connection is established between the RRC layer of the UE and the RRC layer of a wireless network, the UE is in the RRC Connected mode. Otherwise, the UE is in the RRC Idle mode.

Hereinafter, description will be given of the RRC state of the UE and an RRC connection method. The RRC state refers to a state in which the RRC of the UE is or is not logically connected with the RRC of the E-UTRAN. The RRC state of the UE having logical connection with the RRC of the E-UTRAN is referred to as an RRC_CONNECTED state. The RRC state of the UE which does not have logical connection with the RRC of the E-UTRAN is referred to as an RRC_IDLE state. A UE in the RRC_CONNECTED state has RRC connection, and thus the E-UTRAN may recognize presence of the UE in a cell unit. Accordingly, the UE may be efficiently controlled. On the other hand, the E-UTRAN cannot recognize presence of a UE which is in the RRC_IDLE state. The UE in the RRC_IDLE state is managed by a core network in a tracking area (TA) which is an area unit larger than the cell. That is, for the UE in the RRC_IDLE state, only presence or absence of the UE is recognized in an area unit larger than the cell. In order for the UE in the RRC_IDLE state to be provided with a usual mobile communication service such as a voice service and a data service, the UE should transition to the RRC_CONNECTED state. A TA is distinguished from another TA by a tracking area identity (TAI) thereof. A UE may configure the TAI through a tracking area code (TAC), which is information broadcast from a cell.

When the user initially turns on the UE, the UE searches for a proper cell first. Then, the UE establishes RRC connection in the cell and registers information thereabout in the core network. Thereafter, the UE stays in the RRC_IDLE state. When necessary, the UE staying in the RRC_IDLE state selects a cell (again) and checks system information or paging information. This operation is called camping on a cell. Only when the UE staying in the RRC_IDLE state needs to establish RRC connection, does the UE establish RRC connection with the RRC layer of the E-UTRAN through the RRC connection procedure and transition to the RRC_CONNECTED state. The UE staying in the RRC_IDLE state needs to establish RRC connection in many cases. For example, the cases may include an attempt of a user to make a phone call, an attempt to transmit data, or transmission of a response message after reception of a paging message from the E-UTRAN.

The non-access stratum (NAS) layer positioned over the RRC layer performs functions such as session management and mobility management.

Hereinafter, the NAS layer shown in FIG. 3 will be described in detail.

The ESM (evolved Session Management) belonging to the NAS layer performs functions such as default bearer management and dedicated bearer management to control a UE to use a PS service from a network. The UE is assigned a default bearer resource by a specific packet data network (PDN) when the UE initially accesses the PDN. In this case, the network allocates an available IP to the UE to allow the UE to use a data service. The network also allocates QoS of a default bearer to the UE. LTE supports two kinds of bearers. One bearer is a bearer having characteristics of guaranteed bit rate (GBR) QoS for guaranteeing a specific bandwidth for transmission and reception of data, and the other bearer is a non-GBR bearer which has characteristics of best effort QoS without guaranteeing a bandwidth. The default bearer is assigned to a non-GBR bearer. The dedicated bearer may be assigned a bearer having QoS characteristics of GBR or non-GBR.

A bearer allocated to the UE by the network is referred to as an evolved packet service (EPS) bearer. When the EPS bearer is allocated to the UE, the network assigns one ID. This ID is called an EPS bearer ID. One EPS bearer has QoS characteristics of a maximum bit rate (MBR) and/or a guaranteed bit rate (GBR).

Figure 5:
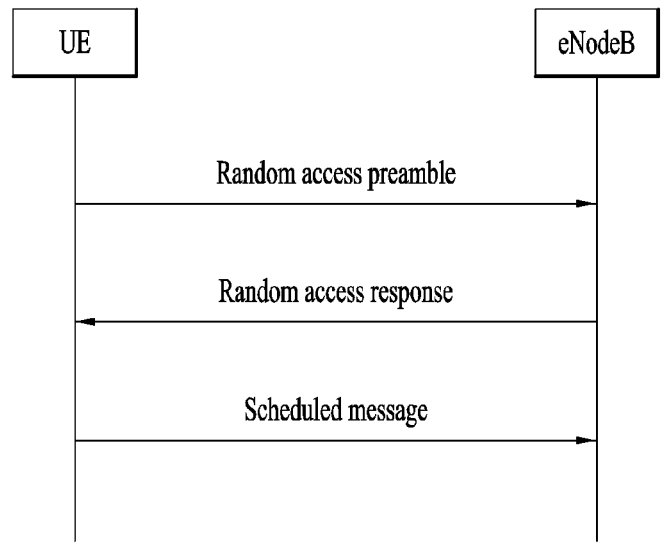
FIG. 5 is a flow chart illustrating a random access procedure.

FIG. 5 is a flowchart illustrating a random access procedure in 3GPP LTE.

The random access procedure is performed for a UE to obtain UL synchronization with an eNB or to be assigned a UL radio resource.

The UE receives a root index and a physical random access channel (PRACH) configuration index from an eNodeB. Each cell has 64 candidate random access preambles defined by a Zadoff-Chu (ZC) sequence. The root index is a logical index used for the UE to generate 64 candidate random access preambles.

Transmission of a random access preamble is limited to a specific time and frequency resources for each cell. The PRACH configuration index indicates a specific subframe and preamble format in which transmission of the random access preamble is possible.

The UE transmits a randomly selected random access preamble to the eNodeB. The UE selects a random access preamble from among 64 candidate random access preambles and the UE selects a subframe corresponding to the PRACH configuration index. The UE transmits the selected random access preamble in the selected subframe.

Upon receiving the random access preamble, the eNodeB sends a random access response (RAR) to the UE. The RAR is detected in two steps. First, the UE detects a PDCCH masked with a random access (RA)-RNTI. The UE receives an RAR in a MAC (medium access control) PDU (protocol data unit) on a PDSCH indicated by the detected PDCCH.

Figure 6:
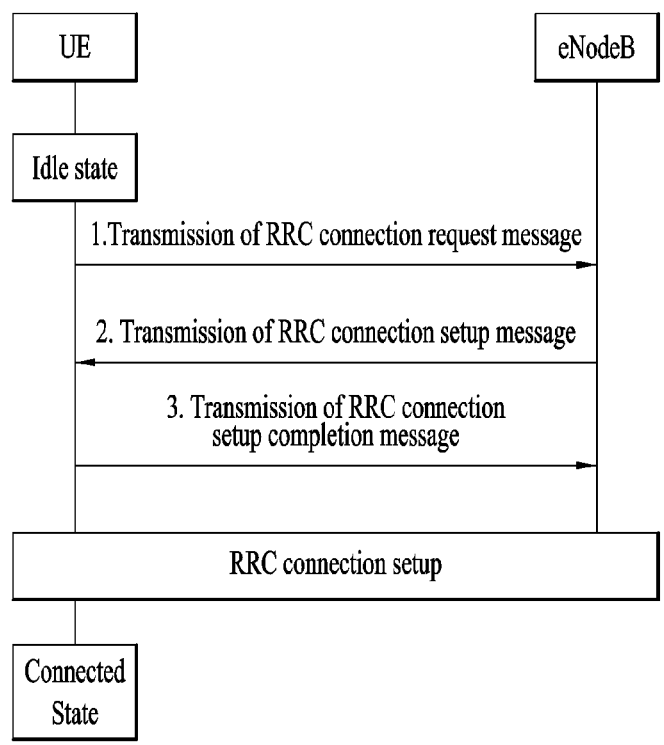
FIG. 6 is a diagram illustrating a connection procedure in a radio resource control (RRC) layer.

FIG. 6 illustrates a connection procedure in a radio resource control (RRC) layer.

As shown in FIG. 6, the RRC state is set according to whether or not RRC connection is established. An RRC state indicates whether or not an entity of the RRC layer of a UE has logical connection with an entity of the RRC layer of an eNodeB. An RRC state in which the entity of the RRC layer of the UE is logically connected with the entity of the RRC layer of the eNodeB is called an RRC connected state. An RRC state in which the entity of the RRC layer of the UE is not logically connected with the entity of the RRC layer of the eNodeB is called an RRC idle state.

A UE in the Connected state has RRC connection, and thus the E-UTRAN may recognize presence of the UE in a cell unit. Accordingly, the UE may be efficiently controlled. On the other hand, the E-UTRAN cannot recognize presence of a UE which is in the idle state. The UE in the idle state is managed by the core network in a tracking area unit which is an area unit larger than the cell. The tracking area is a unit of a set of cells. That is, for the UE which is in the idle state, only presence or absence of the UE is recognized in a larger area unit. In order for the UE in the idle state to be provided with a usual mobile communication service such as a voice service and a data service, the UE should transition to the connected state.

When the user initially turns on the UE, the UE searches for a proper cell first, and then stays in the idle state. Only when the UE staying in the idle state needs to establish RRC connection, the UE establishes RRC connection with the RRC layer of the eNodeB through the RRC connection procedure and then performs transition to the RRC connected state.

The UE staying in the idle state needs to establish RRC connection in many cases. For example, the cases may include an attempt of a user to make a phone call, an attempt to transmit data, or transmission of a response message after reception of a paging message from the E-UTRAN.

In order for the UE in the idle state to establish RRC connection with the eNodeB, the RRC connection procedure needs to be performed as described above. The RRC connection procedure is broadly divided into transmission of an RRC connection request message from the UE to the eNodeB, transmission of an RRC connection setup message from the eNodeB to the UE, and transmission of an RRC connection setup complete message from the UE to eNodeB, which are described in detail below with reference to FIG. 6.

1) When the UE in the idle state desires to establish RRC connection for reasons such as an attempt to make a call, a data transmission attempt, or a response of the eNodeB to paging, the UE transmits an RRC connection request message to the eNodeB first.

2) Upon receiving the RRC connection request message from the UE, the ENB accepts the RRC connection request of the UE when the radio resources are sufficient, and then transmits an RRC connection setup message, which is a response message, to the UE.

3) Upon receiving the RRC connection setup message, the UE transmits an RRC connection setup complete message to the eNodeB. Only when the UE successfully transmits the RRC connection setup message, does the UE establish RRC connection with the eNodeB and transition to the RRC connected mode.

2. ProSe (Proximity Service)

As described above, ProSe service means a service that enables discovery between physically proximate devices and mutual direct communication, communication through a base station or communication through a third device.

Figure 7:
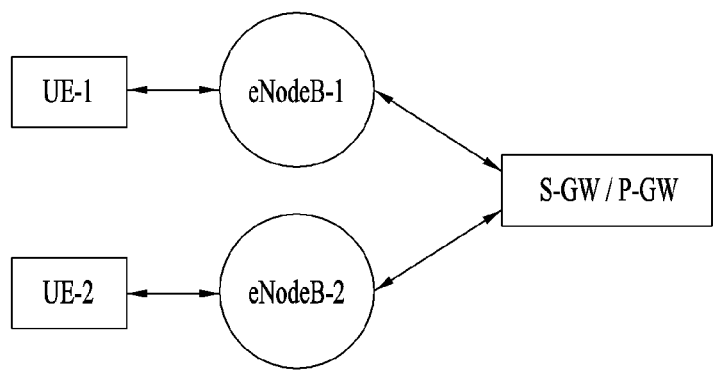
FIG. 7 illustrates a basic path for communication between two UEs in the EPS.

FIG. 7 illustrates a default data path through which two UEs perform communication with each other in an EPS. This default data path passes through an eNodeB and a core network (i.e., EPC), which are managed by an operator. In the present invention, this path will be referred to as an infrastructure data path (or EPC path). Also, communication through this infrastructure data path will be referred to as infrastructure communication.

Figure 8:
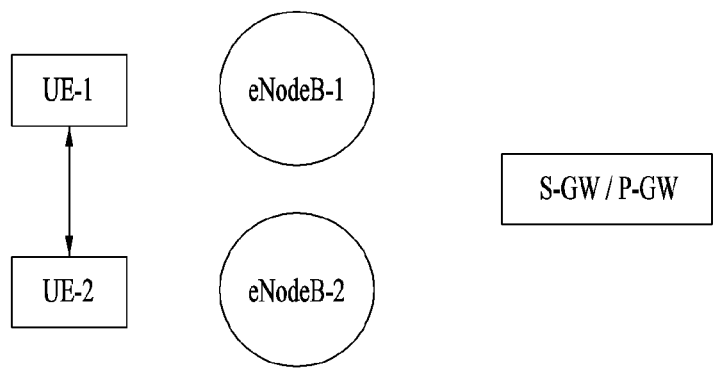
FIG. 8 illustrates a ProSe-based direct-mode communication path between two UEs.
Figure 8:
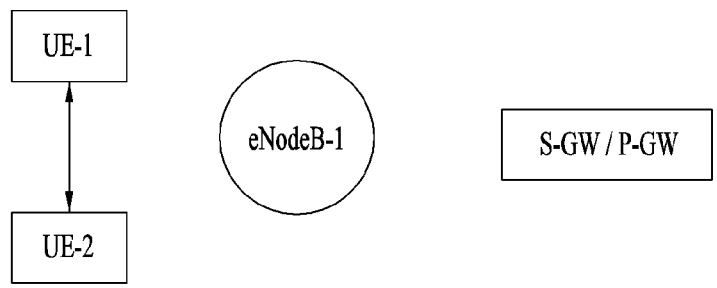

FIG. 8 illustrates a direct mode data path between two UEs based on ProSe. This direct mode communication path does not pass through the eNodeB and the core network (i.e., EPC), which are managed by an operator. FIG. 8(a) illustrates a case that UE-1 and UE-2 are camping on different eNodeBs and exchange data through a direct mode communication path. FIG. 8(b) illustrates a case that two UEs are camping on the same eNodeB and exchange data through a direct mode communication path.

Figure 9:
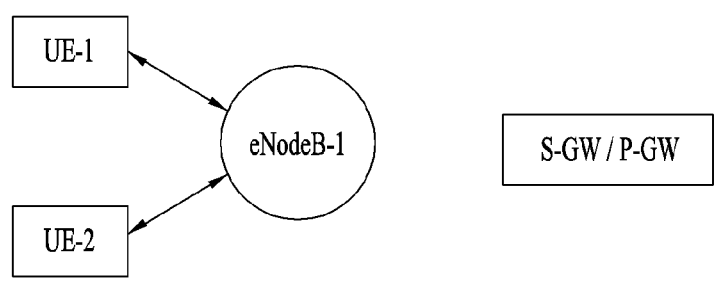
FIG. 9 illustrates a ProSe-based communication path between two UEs through an eNodeB.

FIG. 9 illustrates a locally routed data path through eNodeB between two UEs based on ProSe. This communication path through eNodeB does not pass through a core network (i.e., EPC) managed by an operator.

Figure 10:
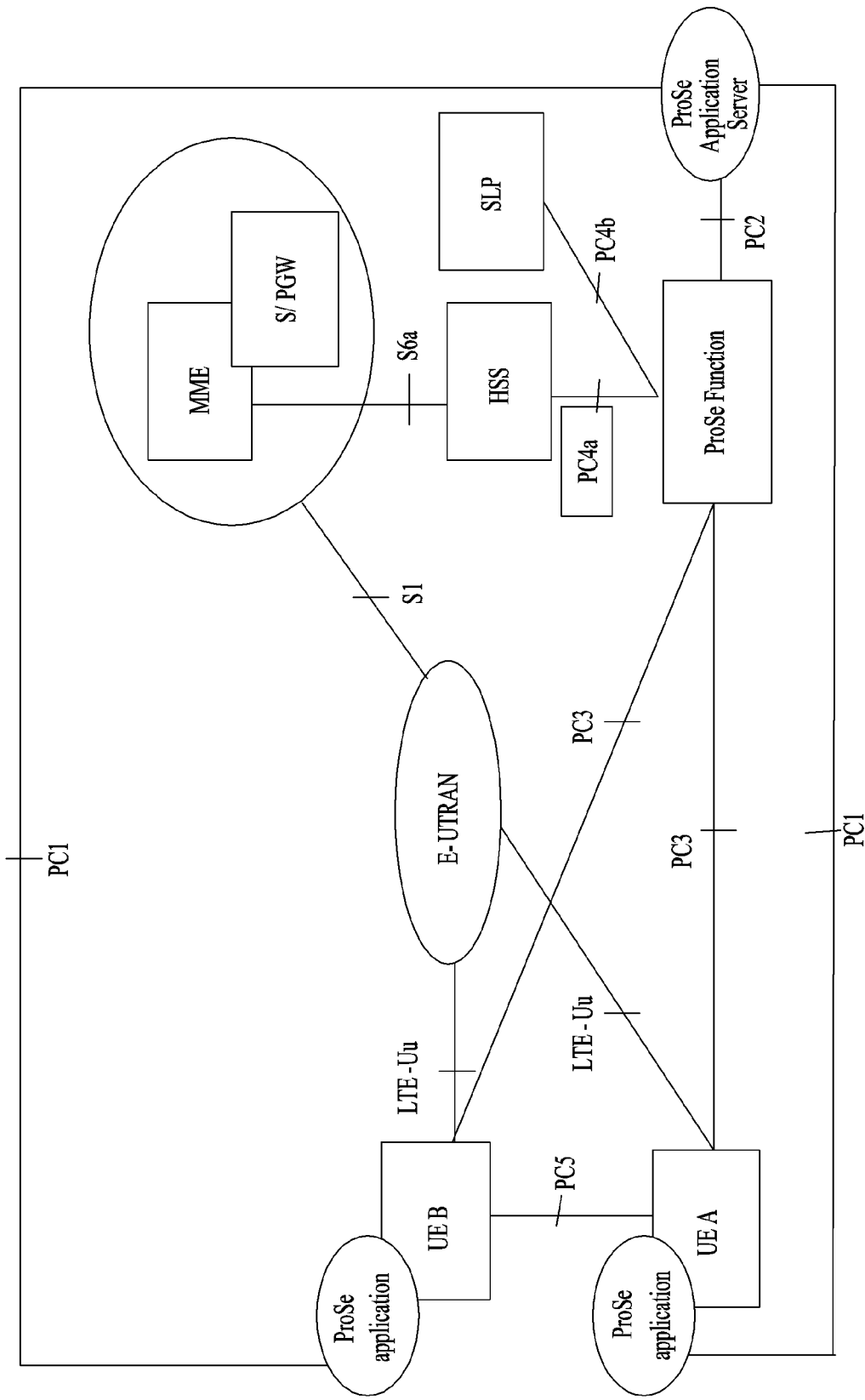
FIG. 10 illustrates a non-roaming reference architecture.

A non-roaming reference architecture is shown in FIG. 10. In the structure of FIG. 10, the EPC may determine proximity of two UEs and perform an EPC-level ProSe discovery procedure to notify the UE of the determined result. For this EPC-level ProSe discovery, a ProSe Function serves to determine proximity of two UEs and notify the UE of the determined result.

The ProSe function may retrieve and store ProSe associated subscriber data and/or ProSe associated subscriber data from HSS, and perform authentication and configuration for EPC level ProSe discovery and EPC sub WLAN direct discovery communication. Also, the ProSe function may be operated as a location service client that enables EPC level discovery, and may provide the UE of information for assisting WLAN direct discovery and communication. The ProSe function handles EPC ProSe User IDs and Application Layer User ID, and exchanges a signal with a third party application server for application registration identifier mapping. For transmission of a proximity request, proximity alerts and location report, the ProSe function exchanges a signal with a ProSe function of other PLMNs. In addition, the ProSe function provides various parameters required for ProSe discovery and ProSe communication. Details of the ProSe function are based on 3GPP TS 23.303.

Figure 11:
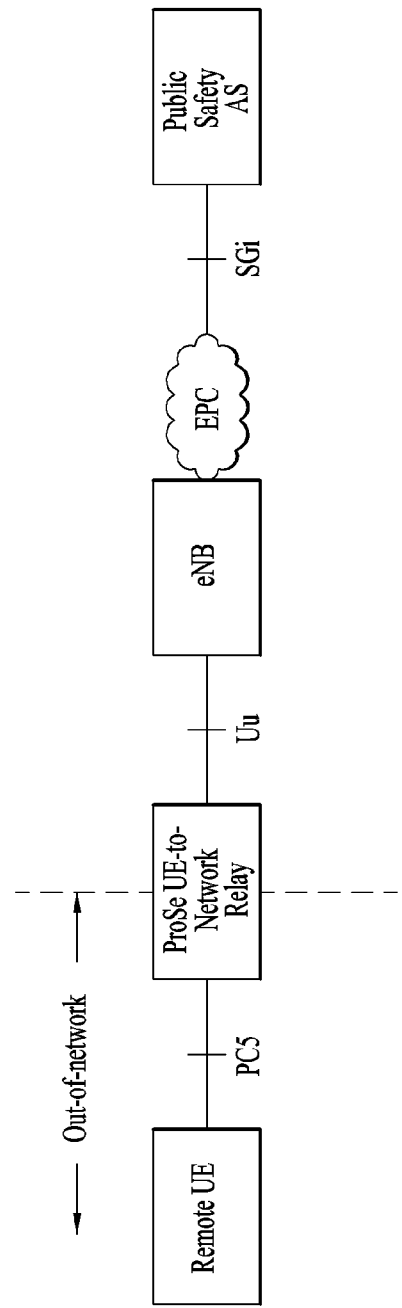
FIG. 11 is a diagram illustrating communication through a Prose UE-to-Network Relay.
Figure 12:
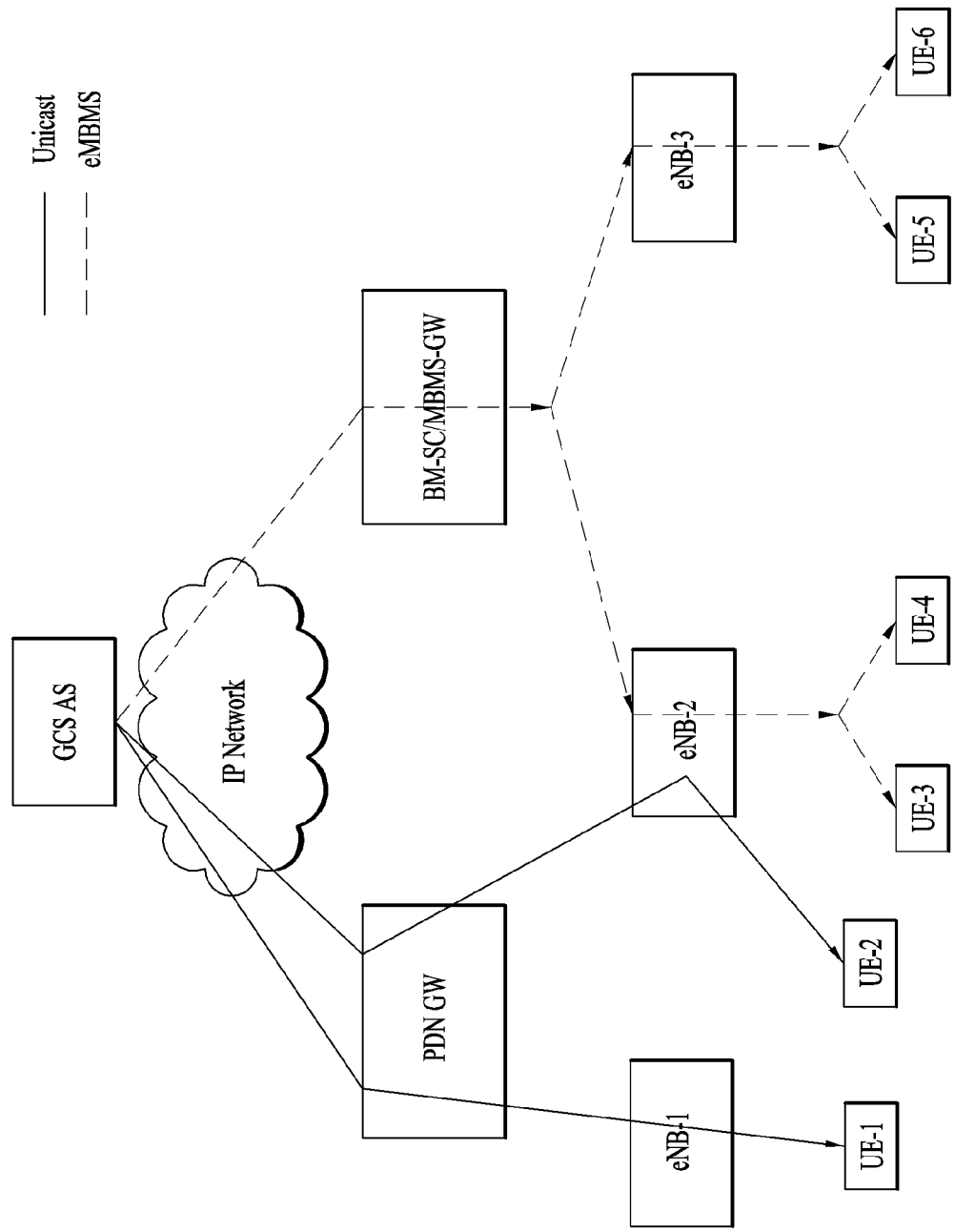
FIG. 12 is a diagram illustrating media traffic of group communication.

FIG. 11 illustrates communication through a ProSe UE-to-Network Relay. When a remote UE has connectivity to an EPC through a UE-to-network relay, the remote UE can communicate with an application server (AS) or participate in group communication. FIG. 12 shows an example in which a remote UE participate in group communication. UE-1 to UE-6 which are UEs belonging to the same group in FIG. 12 may receive downlink traffic through unicast or MBMS for specific media that configure group communication. As a result, although not in E-UTRAN coverage, the remote UE may transmit media traffic to other group members (that is, generate uplink traffic) by joining group communication through the UE-to-Network Relay or receive media traffic transmitted from other group members. In FIG. 12, a GCS AS (Group Communication Service Application Server) may serve to i) exchange GC1 signalling, ii) receive uplink data from a unicast UE, iii) transfer data to all UEs, which belong to a group, by using Unicast/MBMS delivery, iv) transmit application level session information through Rx interface to a PCRF, and v) support a service continuity procedure for a UE which is switched between Unicast Delivery and MBMS Delivery. The GCS AS, Public Safety AS, and GCSE AS (Group Communication Service Enabler Application Server) may be interpreted to refer to the same meaning and include AS that controls/manages communication joined by a plurality of UEs. Details of group communication is based on TS 23.468.

Figure 13:
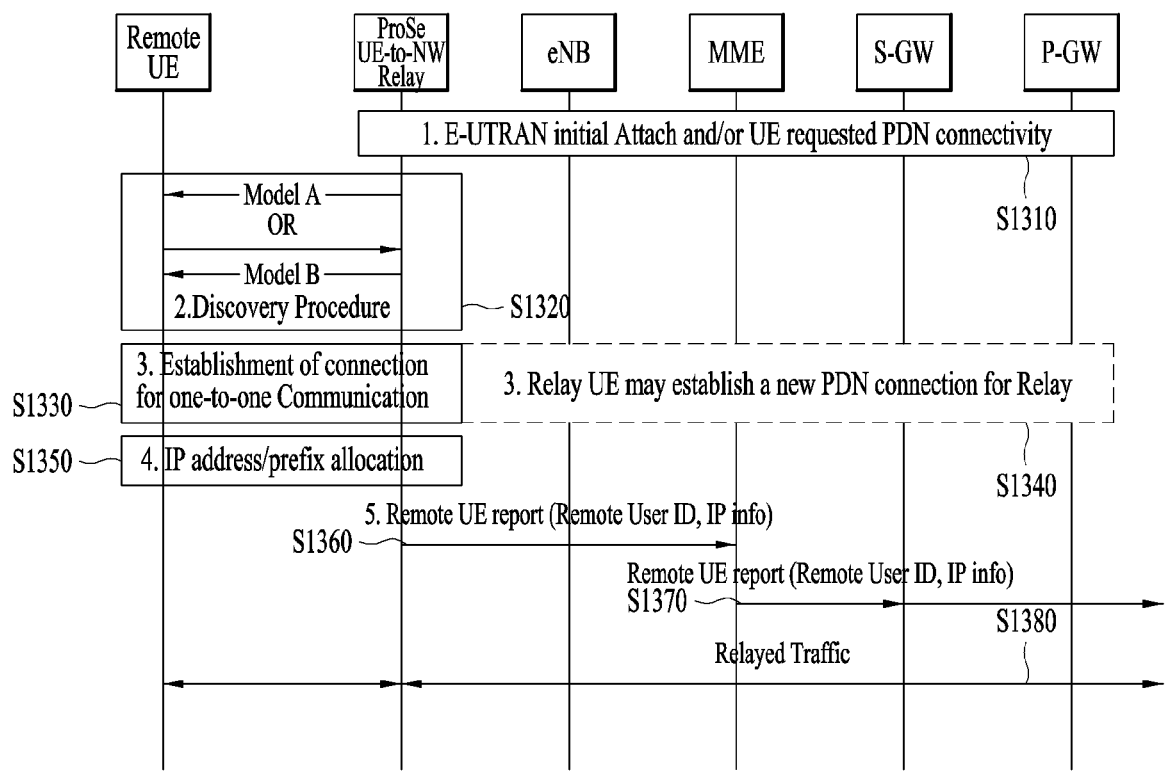
FIG. 13 is a diagram illustrating a procedure in which a remote UE performs direct communication through a UE-to-network relay.

FIG. 13 illustrates a procedure in which a remote UE that is not served by an E-UTRAN performs direct communication through a UE-to-network relay. A UE capable of operating as a ProSe UE-to-network relay may establish a PDN connection to provide relay traffic to the remote UE by accessing the network. The PDN connection supporting the UE-to-network relay is used only to provide the relay traffic to the remote UE.

First, a relay UE establishes a PDN connection through initial access to an E-UTRAN [S1310]. In the case of IPv6, the relay UE obtains an IPv6 prefix using a prefix delegation function. Next, the relay UE performs a discovery procedure, which differs depending on either Model A or Model B, together with a relay UE [S1320]. The remote UE selects the relay UE discovered through the discovery procedure and then establishes one-to-one direct connection [S1330]. If there is no PDN connection associated with a relay UE ID or if an additional PDN connection for relay operation is required, the relay UE initiates a new PDN connection procedure [S1340].

Next, an IPv6 prefix or an IPv4 address is allocated to the remote UE [S1350], and then uplink/downlink relay operation is initiated. When the IPv6 prefix is allocated, an IPv6 stateless address auto-configuration procedure configured with router solicitation signaling from the remote UE to the relay UE and router advertisement signaling from the relay UE to the remote UE is initiated. On the other hand, when the IPv4 address is allocated, an IPv4 address allocation using DHCPv4 procedure configured with DHCPv4 discovery signaling (from the remote UE to the relay UE), DHCPv4 offer signaling (from the relay UE to the remote UE), DHCPv4 request signaling (from the remote UE to the relay UE), and DHCPv4 ACK signaling (from the relay UE to the remote UE) is initiated.

Thereafter, the relay UE performs a Remote UE Report procedure for informing an MME that the relay UE is connected to the remote UE [S1360]. The MME performs a Remote UE Report Notification procedure to inform an SGW and a PGW that the new remote UE is connected [S1370]. Then, the remote UE performs communication with the network through the relay UE [S1380]. Details of the direct connection generation procedure could be found in TS 23.303.

3. Tracking Area Update (TAU) Procedure

Figure 14:
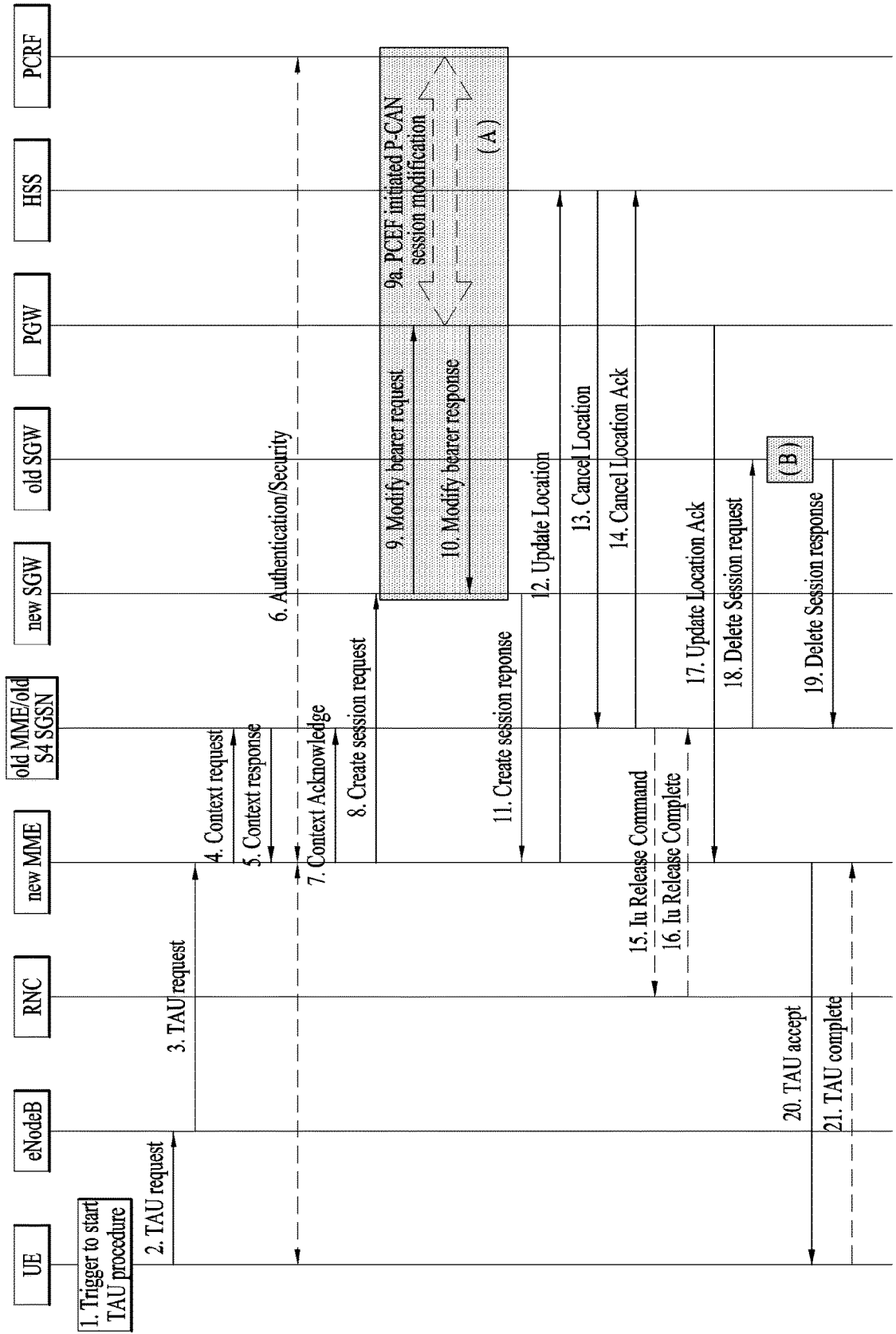
FIG. 14 illustrates a case in which an SGW is changed together with a tracking area update (TAU) procedure.

FIG. 14 illustrates a case in which an SGW is changed together with a TAU procedure. In FIG. 14, an MME is also changed. When the TAU procedure is triggered, a UE transmits a TAU request message to an evolved node B (eNodeB or eNB). In this case, while a procedure for establishing a NAS signaling connection (e.g., attach/TAU/service request) is performed, a NAS layer of the UE provides a lower layer (e.g., AS layer) with an S-TMSI (System Architecture Evolution (SAE) Temporary Mobile Subscriber Identity), which is allocated by a previous MME, or a GUMMEI (Globally Unique MME Identifier) of the previous MME. When the tracking area (TA) of the current cell is in the list of TAs that the UE previously registered in the MME during the NAS signalling connection establishment, the NAS layer of the UE provides the lower layer with the S-TMSI rather than the MME identifier. On the contrary, when the TA of the current cell is not in the list of TAs that the UE previously registered in the MME during the NAS signalling connection establishment, the NAS layer of the UE provides the lower layer with the MME identifier part of the GUTI with an indication that the MME identifier is a native GUMMEI. (when the tracking area of the current cell is in the list of tracking areas that the UE previously registered in the MME during the NAS signalling connection establishment, the UE NAS shall provide the lower layers with the S-TMSI, but shall not provide the registered MME identifier to the lower layers; or When the tracking area of the current cell is not in the list of tracking areas that the UE previously registered in the MME during the NAS signalling connection establishment, the UE NAS shall provide the lower layers with the MME identifier part of the valid GUTI with an indication that the identifier is a native GUMMEI).

The above-described S-TMSI or GUMMEI is provided to the AS layer together with the TAU request message, and the AS layer of the UE forwards the received S-TMSI or GUMMEI to the eNB. The eNB performs an NNSF (NAS Node Selection Function) based on the received S-TMSI or GUMMEI and then selects an MME that will receive the received NAS message (e.g., TAU request message). In this case, the eNB may select the MME through an MMEC (MME Group Identifier) included in the S-TMSI or an MMEG (MME Group Identifier) and an MMEC (MME code) in the GUMMEI. When the S-TMSI is provided, the previous MME is selected by the MMEC. In addition, the eNB provides the S-TMSI to the MME, and thus, the MME can identify the UE through the S-TMSI.

On the contrary, when the GUMMEI is provided, the NNSF is performed based on the GUMMEI, and then the MME is selected. In this case, the MME may or may not be changed. When a new MME is selected, the new MME derives the GUMMEI of the previous MME from the GUTI in 'old GUTI IE' included in the TAU request message and checks whether there is an interface with the corresponding MME. If signaling with the corresponding MME is possible, the TAU request message including the GUMMEI, which is the identifier of the previous MME, is sent to the new MME, and the new MME requests information on the UE by transmitting a context request message to the previous MME. After receiving the context information on the UE through a context response message from the previous MME, the new MME performs authentication and security procedures for the UE with respect to an HSS. When the new MME transmits a context acknowledgement message to the previous MME, an MME change procedure is completed.

Next, the new MME transmits a create session request message to a new SGW, which is changed (i.e., relocated). When the RAT (Radio Access Technology) is changed due to the MME change, the new MME transmits a modify bearer request message to a PGW, and RAT information is transmitted from the PGW to a PCRF. The PGW updates a bearer context and transmits a modify bearer response message to the SGW. If the update of the bearer context is completed, the SGW transmits a create session response message to the new MME.

When the new MME does not have subscriber information of the UE or in a scenario of sharing a specific network, the new MME transmits an update location message to the HSS. After receiving the message, the HSS exchanges a cancel location message and a cancel location acknowledgement message with the previous MME. The previous MME deletes the context information of the UE. In the case of an SGSN, the SGSN exchanges an Iu release command message and an Iu release complete message with an RNC.

The HSS transmits an update location acknowledge message to the new MME as a response. Meanwhile, the previous MME/SGSN transmits a delete session request message to the previous SGW to release EPS bearer resources. The previous SGW transmits a delete session response message and deletes packets stored in the buffer.

Meanwhile, when the UE cannot access the corresponding TA due to regional subscription restriction or access restriction, the new MME transmits a TAU reject message to the UE. Otherwise, the new MME transmits a TAU accept message to the UE. In this case, the TAU accept message includes a GUTI (Globally Unique Temporary Identifier) of the new MME. After receiving the TAU accept message, the UE transmits a TAU complete message. By doing so, the TAU procedure is completed. Meanwhile, the details of the TAU procedure and the definitions of the TAU request message, TAU reject message, TAU accept message, and TAU complete message including information included therein are based on TS 24.301.

4. Proposed D2D Direct Communication Method

In the case of an existing UE-to-network relay UE, since the UE-to-network relay UE operates on the assumption that a remote UE is out of coverage, a network is not interested in managing a context of the remote UE. If context information of the remote UE is stored in the network, unnecessary paging may occur.

However, the proposed embodiment considers a case in which not only the relay UE but also the remote UE are in coverage and proposes that the network recognizes the remote UE and manage the context of the remote UE. When the network manages the context information of the remote UE, a procedure in which the relay UE allocates an IP address for the remote UE may be omitted.

Recently, beyond the smartphone or mobile terminal, various IoT devices have been introduced, and as a representative example, a wearable device, a smartwatch, a vehicle terminal, etc. are considered. Such terminals (UEs) can be implemented to communicate with the network in a stand-alone manner. In the case of a UE capable of stand-alone communication with the network, signaling with the network occurs in each UE. That is, since as the number of IoT UEs increases, the amount of signaling exponentially increases, the network may have a serious signaling overhead problem.

Meanwhile, low-power UEs can be divided into the following three types: i) a UE that is independent and has a cellular identity; ii) a UE that is dependent and has a cellular identity; and iii) a UE that is dependent and has no cellular identity. In the proposed embodiment, a scenario in which among the three types of UEs, the second type of UE, specifically, an IoT UE that is dependent and has a cellular identity coexists with an independent UE is considered. In particular, methods performed by a network for efficiently managing UEs and subscriber information of the corresponding UEs will be described.

Figure 15:
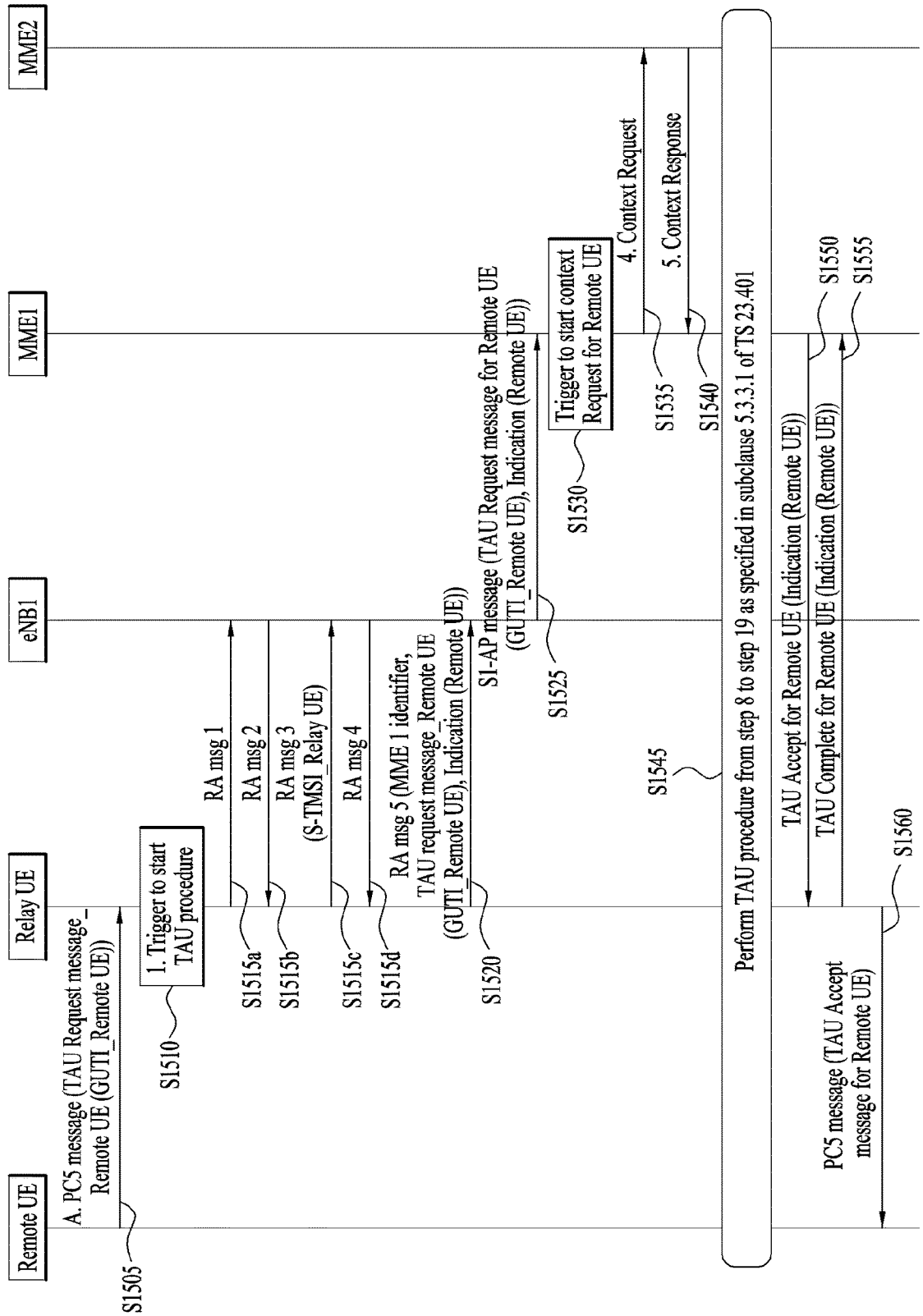
FIGS. 15 to 17 illustrate direct communication methods according to proposed embodiments.
Figure 16:
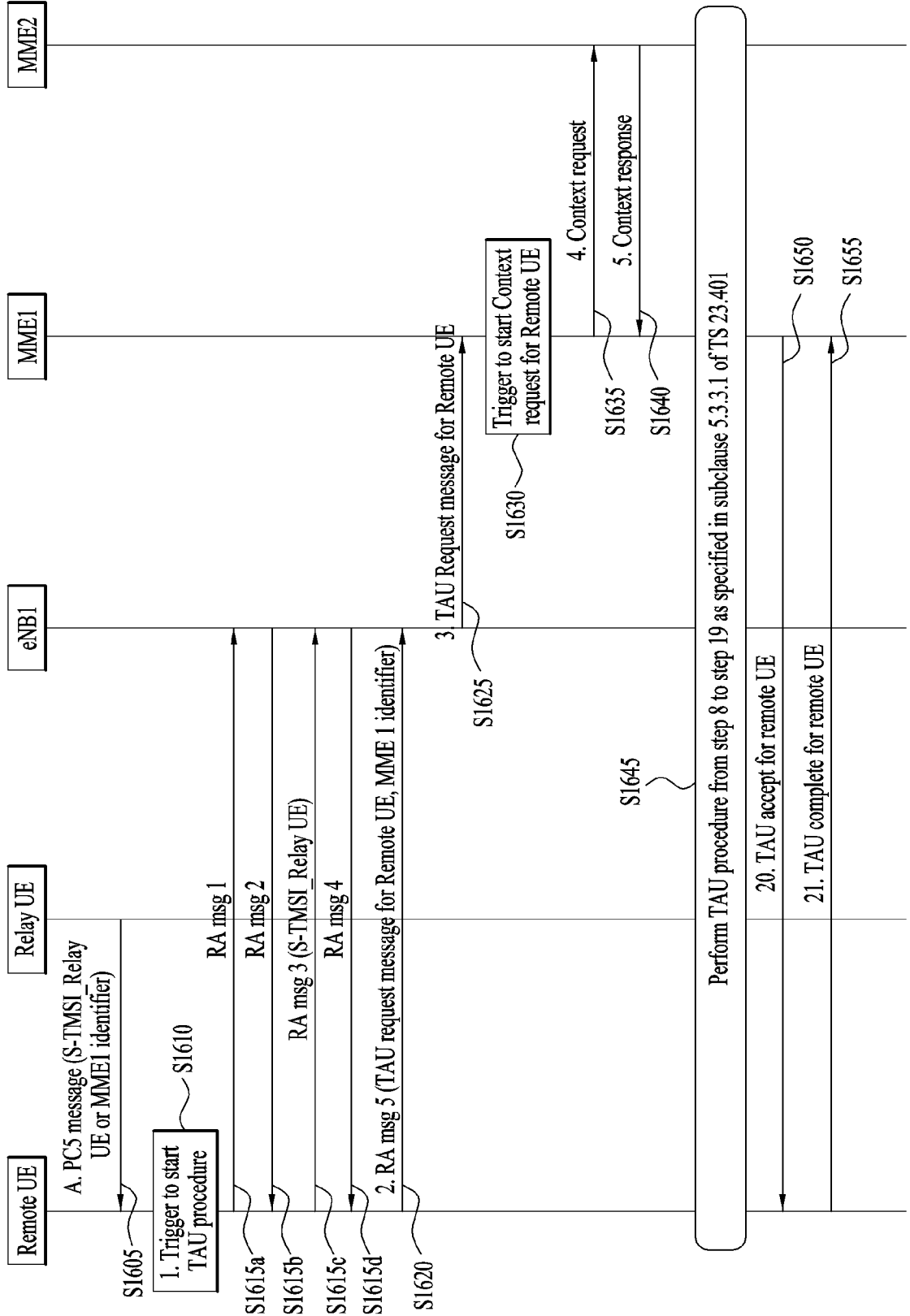
Figure 17:
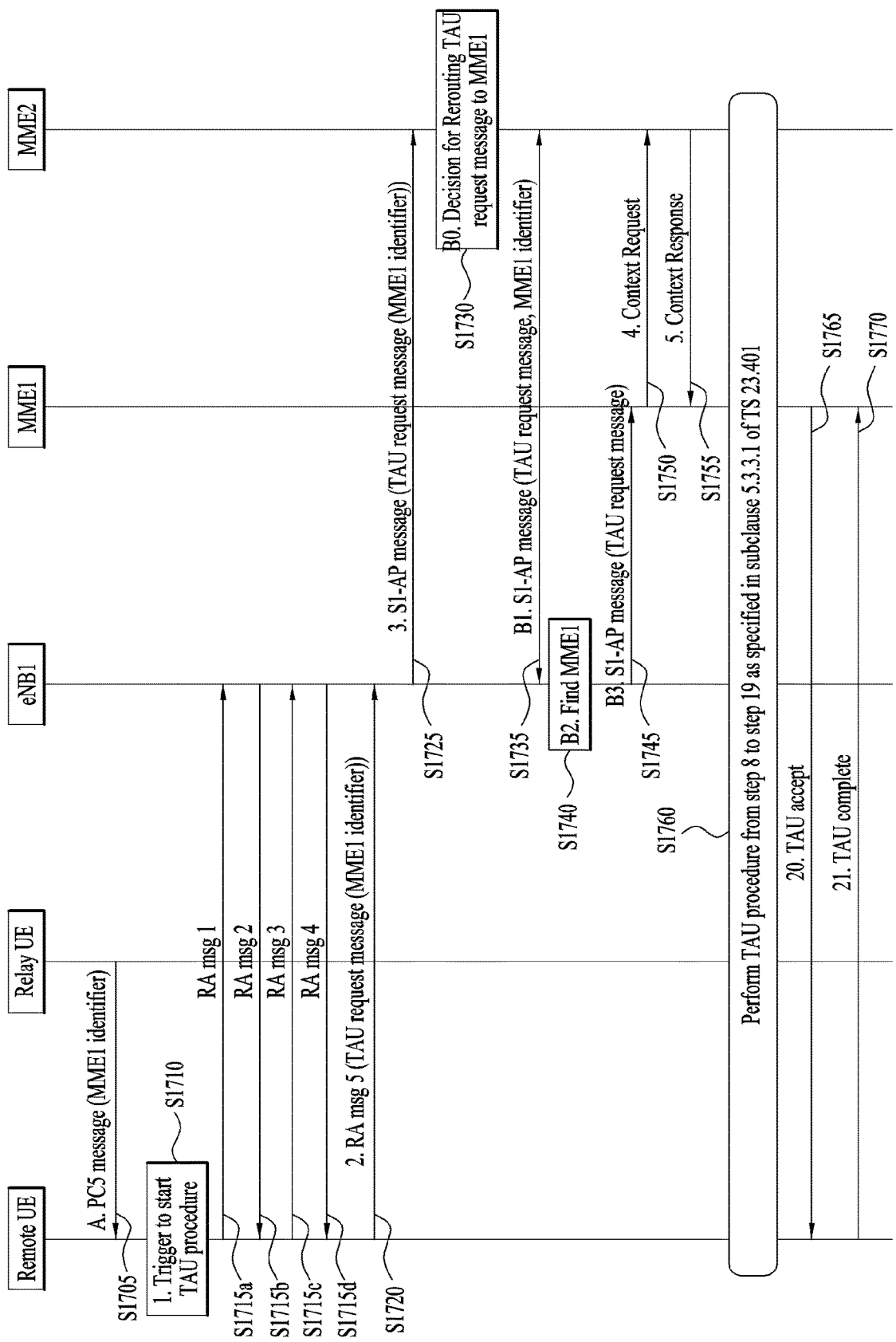

FIGS. 15 to 17 illustrate direct communication methods according to proposed embodiments.

Although a user may use various UEs independently, the user may use at least one UE at the same time. For example, a mobile UE and an IoT UE may be simultaneously used, or a plurality of mobile UEs and IoT UEs may be simultaneously used. In the proposed embodiment, when a plurality of UEs coexist, a method for reducing power consumption and mobility-related signaling of the UEs by establishing a relationship among the UEs and controlling signaling will be described. In addition, it is assumed in the following description that a UE has a capability of independently communicating with an EPC.

Hereinafter, a description will be given of a process for establishing a relationship among a plurality of UEs. The relationship establishment process can be divided into two methods. First, according to a preconfigured method, the network has a plurality of pieces of user (or subscriber) information for individual UEs. In addition, the network requires additional information to recognize a relationship among the individual pieces of user (or subscriber) information, and each UE also requires additional information to recognize the relationship among the individual pieces of user information. Thereafter, the network and individual UEs establish the relationship using the above-described additional information. Details will be described later.

The additional information may include at least one of information on a UE group and information on classes or priorities of UEs. In this case, the information on the UE group may be stored as a group identifier indicating a specific group or it may include identifiers of UEs. The information on the classes or priorities of the UEs may mean information indicating relative classes or priorities among the UEs when one or more UEs exist, and it may mean information on a subordinate relationship (e.g., primary/secondary, master/slave, etc.). The network and individual UEs may establish the relationship among the plurality of UEs using the above-described additional information together with the individual user information (or subscriber information).

Second, according to a non-preconfigured method, even when there is no preconfigured information for recognizing a relationship between UEs, the relationship may be configured through mutual agreement among the UEs. The UEs may perform the agreement procedure by informing the network of their intentions. Details will be described later.

Next, based on the above-described two methods, particular processes for establishing the relationship among the plurality of UEs will be described. If the UEs are close to each other, the UEs perform a D2D discovery procedure. In this case, the D2D connection may be established through E-UTRAN corresponding to the 3GPP network, Wi-Fi Direct, or Bluetooth.

While the adjacent UEs establish the connection, a representative UE is configured. The process for configuring the representative UE may be differently performed according to the above-described two relationship establishment methods. In the preconfigured method, the representative UE is selected in advance from among the plurality of UEs. That is, when the additional information for recognizing the relationship among the UEs includes the information on the classes or priorities of the UEs, not only the network but also the UEs have the additional information. Thus, the representative UE can be determined in advance from among the plurality of UEs according to the corresponding class or priority. Meanwhile, in the following description, 'representative UE' means at least one UE that represents a plurality of UE groups, and 'subordinate UEs' may mean other UEs except the representative UE in the plurality of UE groups. The UE group may be composed of at least one representative UE and at least one subordinary UE.

Second, in the non-preconfigured method, the representative UE may be determined by signaling among the UEs. Alternatively, it may be determined by the network through signaling from the network. In this case, signaling may include information on capability or power of the UEs as well as the above-described class or priority information of the individual UEs. Specifically, the power information may represent the remaining battery amount or power efficiency of each UE. That is, the information for selecting the representative UE from among the plurality of UEs may be transmitted and received among the UEs or to the network in order to configure the representative UE.

Specifically, the UEs may transmit and receive the above-mentioned information using a PC5 message through a PC5 interface to configure the representative UE. However, if the individual UEs request the network to select the representative UE, the network may check requests from the UEs and then select the representative UE from among the plurality of UEs. In this case, there may be a separate application server in charge of establishing the relationship among the UEs and managing the information for selecting the representative UE. The network requests the application server to establish the relationship among the UEs and then receive the corresponding results, and the application server may be considered as a function or functional entity for establishing the relationship and determining the representative UE.

If the representative UE is configured, each UE activates a UE group including a plurality of UEs. In other words, a prescribed UE group including a plurality of UEs is formed. Each UE transmits signaling to the network (e.g., MME) to activate the UE group. For example, if a specific UE transmits a request for activating the UE group through NAS signaling (for example, a TAU request message or a newly defined NAS message) to the MME, the MME transmits a response to the request through different NAS signaling (for example, a TAU accept message, a TAU reject message, or a newly defined NAS message) to the UE. The request message for activating the UE group may include at least one of an identifier of the UE group, identifiers of UEs belonging to the UE group, and an indicator/information element (IE) for requesting the activation of the UE group.

The configured representative UE may transmit the aforementioned request for the UE group activation to the network. Alternatively, all of the plurality of UEs may transmit the request for the UE group activation to the network, respectively. In the latter case, after collecting the requests from the UEs, the network may respond to all the UEs or only the representative UE. In addition, upon receiving the request for the UE group activation from one or more UEs, the network may perform interaction with the application server in charge of establishing the relationship among the UEs if necessary.

Hereinafter, a description will be given of how UEs and network entities operate after the UE group activation. When the relationship among the UEs is configured, the UE group is formed, and then the representative UE is selected as described above, the UEs and network entities (e.g., MME) recognize the relationship among the plurality of UEs. Based on access schemes for D2D communication, the operation of subordinary UEs can be divided into the following cases: i) when D2D communication is performed through the E-UTRAN; and ii) when D2D communication is performed through Wi-Fi or Bluetooth rather than the E-UTRAN. In the former case, each of the plurality of UEs performs sidelink operation for D2D communication only and deactivates AS layer operation for an Uu interface with the EPC. That is, the eNodeB (eNB) may allocate radio resources for the sidelink operation to the plurality of UEs. On the other hand, in the latter case, each of the plurality of UEs may deactivate all AS layers. That is, since there is no process where the eNodeB (eNB) allocates sidelink radio resources, the plurality of UEs in the latter case may deactivate sidelinks as well.

In the following description, the definition of the AS layer operation may vary depending on D2D connection types. When a D2D connection is established through the E-UTRAN as described above, the AS layer operation may mean communication operation with the EPC through the Uu interface. On the other hand, when a D2D connection is established through Wi-Fi or Bluetooth rather than the E-UTRAN, the AS layer operation may mean both the communication operation with the EPC through the Uu interface and the sidelink operation.

Hereinafter, a description will be given of a case in which mobile terminating (MT) call/data is received. When receiving downlink data notification (DDN) for a specific UE, a network entity (e.g., MME) recognizes a UE group to which the UE corresponding to a DDN target belongs and performs paging of a representative UE of the UE group to which the corresponding UE belongs. A paging message transmitted to the representative UE may include an identifier of the specific UE corresponding to the DDN target.

After receiving the paging message, the representative UE of the UE group forwards the paging message to the specific UE corresponding to the target through a sidelink. After receiving the paging message, the UE activates the AS layer and performs cell selection. If the UE completes the cell selection process successfully, the UE performs a service request (SR) procedure, receives the MT call/data, and transmits a paging response message to the network entity. If the UE completes the reception of the MT call/data, the UE deactivates the AS layer again and performs operation for the sidelink communication with the representative UE of the UE group. The UE may deactivate the AS layer immediately after completing the reception of the MT call/data or after entering an EMM-IDLE state.

Meanwhile, during the above-described processes, the representative UE of the UE group may monitor one paging message or a plurality of paging messages at a time. In the former case, the paging message is implemented to include the identifier of the UE belonging to the UE group. In the latter case, the representative UE of the UE group may monitor paging messages for a plurality of UEs belonging to the UE group at a time.

Next, a description will be given of a case in which mobile originating (MO) call/data is transmitted. When there is MO call/data or MO signaling from a UE, the UE activates the AS layer and performs the cell selection. If the UE completes the cell selection successfully, the UE performs the SR procedure and transmits the MO call/data or MO signaling to the network. If the UE completes the transmission of the MO call/data or MO signaling, the UE deactivates the AS layer again and performs the operation for the sidelink communication with the representative UE. Similar to the MT call/data, the UE may deactivate the AS layer immediately after transmitting the MO call/data or after entering the EMM-IDLE state.

Hereinafter, the deactivation of the UE group will be explained. The UE group, which was activated according to the aforementioned embodiment, can be deactivated in any one of the following cases, for example: when the quality of a sidelink connection between each subordinary UE and the representative UE in the UE group is lower than a predetermined threshold; when a sidelink connection is disconnected; and when a UE belonging to the UE group desires to deactivate the UE group. In this case, any UE belonging to the UE group or the representative UE may transmit NAS signaling (for example, a TAU message used in the TAU procedure or a newly defined NAS message) to a network entity to deactivate the UE group. In this case, the NAS signaling message may include an indicator or information element (IE) indicating the deactivation of the UE group. When the UE group is deactivated, the network entity and a plurality of UEs can communicate with the EPC in a stand-alone manner, i.e., in the same manner as before the UE group is formed.

Hereinabove, a series of processes in which a plurality of UEs form a UE group based on a predetermined relationship, communicate using the UE group, and deactivate the UE group have been described. The above description has been made on the assumption that one MME has context information of a plurality of UEs. Hereinafter, a description will be given of an operation method when individual UEs belong to different MMEs in the situation that a UE group is formed.

First, a process for PLMN alignment between a relay UE and a remote UE will be described. A UE that intends to form a UE group and a representative UE should select and register the same PLMN. In this case, the relay UE may be the representative UE, and the remote UE may be a subordinary UE belonging to the UE group. Here, a PLMN of the representative UE (relay UE) can be aligned with respect to (changed to) a PLMN of the subordinary UE (remote UE) and vice versa.

The UEs share information on the currently registered PLMNs (RPLMNs) with each other. To this end, PLMN IDs of the RPLMNs are included in PC5 messages, and then the messages can be transmitted and received. Alternatively, an identifier including a PLMN ID (e.g., GUTI) is included in a PC5 message, and then the PC5 message can be transmitted and received. In the latter case, after receiving the GUTI, a UE can extract the PLMN ID from the GUTI. Meanwhile, as the PC5 message for sharing the PLMN information, a PC5 discovery message (e.g., PC5 discovery announcement message, PC5 discovery solicitation message, PC5 discovery response message, etc.) can be used. Alternatively, PC5 signaling message (e.g., direct communication request message or direct communication accept message used in a direct communication establishment procedure) can be used.

After the relay UE and remote UE share the PLMN information, any one of them performs a PLMN selection procedure to register in the PLMN of the other UE. As the first method, according to a conventional PLMN selection procedure, a ProSe layer of the specific UE transmits information on a register PLMN of the other UE to the NAS layer, the NAS layer of the UE transmits, to the AS layer, an indicator indicating that PLMN selection is required, and then the AS layer transmits broadcasted PLMN IDs to the NAS layer by searching E-UTRAN bands. At this time, if the register PLMN of the other UE is included in the PLMN list, the NAS layer may check that and select the register PLMN. As the second method, the ProSe layer of the specific UE transmits the PLMN information of the other UE to the NAS layer, and the NAS layer transmits to the AS layer that the PLMN selection process for the register PLMN of the other UE is required together with the corresponding PLMN ID. The AS layer checks whether the register PLMN is included in the broadcasted PLMN IDs. When the corresponding PLMN ID is included in the broadcasted PLMN IDs, the AS layer transmits, to the NAS layer, an indicator indicating that the corresponding PLMN ID is included. Thereafter, the NAS layer may select the corresponding PLMN. As the third method, it may be considered that the specific UE sets its PLMN as the register PLMN provided by the other UE.

When the same PLMN is selected by the remote UE and relay UE as described above, the remote UE does not perform the PLMN selection procedure anymore before releasing the direct connection with the other UE (relay UE) to avoid unnecessary PLMN switching. When the PLMN alignment process is successfully completed, the remote UE performs an MME alignment (change) process. In this case, after the completion of the PLMN alignment process, a cell alignment (change) process may be performed before the MME alignment (change) process. To this end, the remote UE and relay UE share cell IDs of the cell which they are currently camped on using PC5 messages. When the cell corresponding to the received cell ID is selected, the remote UE and relay UE may initiate the cell alignment process.

In addition, MME information may be included in a PC5 message, which is transmitted and received while each of a plurality of UEs performs a D2D discovery procedure or a direct link setup. That is, when the PC5 message is transmitted and received, the UEs may share their MME information with each other. The MME information included in the PC5 message may be a UE's GUTI or an MME's GUMMEI.

When the UEs share their MME information as described above, the UEs may recognize that they belong to different MMEs (i.e., they are supported by different MMEs). In this case, the UEs belonging to the different MMEs may operate as follows. First, a plurality of UEs belonging to different MMEs may operate as they belong to the same MME. Second, while a plurality of UEs still belong to different UEs, a representative UE may forward DDN to other UEs in a UE group. Hereinafter, the first method will be described.

Specifically, a certain UE belonging to the UE group performs the TAU procedure for exchanging its MME. In this case, except the representative UE, any subordinary UE in the UE group may become the UE that intends to change the MME. In addition, the representative UE may be a relay UE, and the subordinary UE belonging to the UE group may be a remote UE. Moreover, an MME of the subordinary UE (remote UE) may be changed to that of the representative UE (relay UE) and vice versa. The operation of changing an MME can be achieved when the representative UE or subordinary UE performs the TAU procedure to a target MME or when the subordinary UE performs the TAU procedure to the currently connected MME.

When the TAU procedure to the target MME is performed, the target MME may bring context information of a UE from a previous MME as in the prior art. In this case, identification information of the target MME may be included in an RRC message or TAU request message to exactly represent the target MME. When the RRC message contains the identification information of the target MME, an eNB transmits the TAU request message to the target MME. Such a process will be described in detail with reference to FIGS. 15 and 16.

Meanwhile, when the TAU procedure to the currently connected MME is performed, an MME that receives the TAU request message including the identification information of the target MME (i.e., an MME other than the target MME, for example, an MME currently connected to the UE) checks the identification information of the target UE included in the TAU request message and then forwards the TAU request message to the target MME. This forwarding process may be performed through redirection by the eNB. To bring the context information of the UE from the previous MME, the target MME may perform the TAU procedure by receiving the TAU request message from another MME. It will be described in detail with reference to FIG. 17. In this case, after receiving the TAU request message, the connected MME may not forward the received TAU request message to the target MME. For example, when the eNB cannot perform the redirection due to no interface with the target MME even though the connected MME requests the eNB to perform the redirection, the eNB informs the connected MME of this fact. Thereafter, the MME connected to the eNB may transmit a NAS message (e.g., TAU reject message) to the UE by including a cause why the redirection cannot be performed in the NAS message. By doing so, the remote UE can perform the TAU procedure to the target MME or perform an attach procedure.

Meanwhile, when the TAU procedure to the target MME is performed, if the identification information of the target MME is included in the TAU request message, the target MME may receive the TAU request message. In this case, if the target MME is able to perform interaction with the previous MME, there may be no problem. However, in some cases, it may not operate. For example, when the eNB fails to discover the target MME, when the TAU request message cannot be transmitted due to no interface with the target MME, when the target UE cannot discover the previous MME even though it receives the TAU request message, or when the interaction is impossible due to no interface, there may be problems. In each error case, the eNB and target MME need to transmit, to the UE, a cause why the corresponding error case occurs by including the cause in the RRC message or NAS message (e.g., TAU reject message including the reject cause). Thus, the UE may perform an additional process for the TAU procedure to the currently connected MME or the attach procedure to the target MME.

When the target MME bring the context information of the UE from the previous MME, different MMEs of UEs may be set as the same MME. Thus, an MME that receives DDN from an SGW may operate in a similar way to the UE group activation process for the same MME.

Hereinabove, the case in which a plurality of UEs belonging to an activated UE group have different MMEs has been described. On the other hand, when a UE group is activated, if UEs belonging to the UE group have different MMEs, the UEs may be configured to have the same MME. That is, when the UE group is activated, if UEs in the UE group have different MMEs, the UEs may be configured to belong to the same MME (e.g., a representative UE's MME). Such a process can be implemented by allowing the representative UE's MME to receive context information of UEs from other UEs' MMEs, or it can be implemented by allowing other UEs' MMEs rather than the representative UE's MME to transmit context information of UEs to the representative UE's MME. In this case, the GUTI or GUMMEI can be exchanged as described above to check whether MMEs are identical to each other.

In addition, if the UEs are configured to belong to the same MME while the UE group is activated, the corresponding MME may inform the MME change through interaction with an SGW and PGW. For example, it is assumed that when UE 1 is served by MME 1 and a PDN connection thereof is established through SGW 1 and PGW 1, and when UE 2 is served by MME 2 and a PDN connection thereof is established through SGW 2 and PGW 2, UE 1 is a representative UE. In this case, the serving MME of UE 2 is switched from MME 2 to MME 1, and MME 1 may inform SGW 2 and PGW 2 that the serving MME of UE 2 is changed to MME 1.

Next, the second method (i.e., paging redirection) where while a plurality of UEs still belong to different UEs, a representative UE forwards DDN to other UEs in a UE group will be described.

After a plurality of UEs recognize that they belong to different MMEs, DDN may be transmitted to an MME if MT call/data of a UE except a representative UE occurs. In this case, after receiving the DDN, the MME may forward the received DDN to an MME to which the representative UE belong.

Specifically, a subordinary UE transmits NAS signaling (e.g., a message used in the TAU procedure or new NAS signaling message), and thus an MME (i.e., previous MME) to which the corresponding UE belongs informs the MME to which the representative UE belongs (i.e., target MME) that a specific UE in the UE group belongs to a different MME. By doing so, both the previous MME and target MME recognize that the specific UE's MME is different from the representative UE's MME. In this case, a message transmitted to the target MME may include an identifier of a UE or an identifier of the UE group. In addition, the message may further include an indicator for paging forwarding (or paging redirection). When an MME of another UE rather than the representative UE receives the DDN of the corresponding UE, the MME forwards the DDN message to the target MME. In this case, the forwarded DDN message may include an indicator indicating paging forwarding and an identifier of the corresponding UE. After receiving the DDN message, the target MME performs a paging procedure and includes the identifier of the corresponding UE (i.e., another UE rather than the representative UE) in a paging message.

Meanwhile, after receiving the paging message in accordance with the DDN, the representative UE transmits the paging message or a PC5 message including information indicating that the paging message was received to a UE corresponding to the paging target. After receiving the PC5 message, the UE performs a service request procedure to the currently registered MME. Upon receiving the service request message transmitted from the UE corresponding to the paging target, the MME transmits a signaling message to the target MME to inform that the service request message is received. The target MME receiving the signaling message recognizes that the paging message transmission is successfully performed and then completes the paging message transmission procedure. Meanwhile, when receiving the service request message, the MME performs the service request procedure as in the prior art.

Next, a description will be given of mobility management after the UE group activation (i.e., a case in which services are provided by a new MME due to movements of UEs belonging to the UE group). First, when individual UEs' context information is stored in the same single MME as described above, if mobility occurs, only the representative UE among the UEs in the UE group performs the TAU procedure. That is, when the representative UE is in charge of the mobility management because the UE group is activated, a subordinary UE does not separately perform the TAU procedure in accordance with mobility even when it is in the coverage. Meanwhile, when the TAU procedure needs to be performed for other purposes such as capability or parameter update, a subordinary UE may request the representative UE to perform the TAU procedure through a PC5 message, and thus the representative UE may perform the TAU procedure. Alternatively, the subordinary UE may perform the TAU procedure.

The TAU request message transmitted by the representative UE may include the identifier of the UE group or identifiers of UEs belonging to the UE group. When the new MME intends to bring context information from the previous MME after receiving the TAU request message from the representative UE, the new MME send a request by including the identifier of the UE group, the identifiers of the UEs belonging to the UE group, or a prescribed indicator (for example, an indicator for requesting contexts of all the UEs belonging to the UE group). When receiving the request, the previous MME transmits context information related to all the UEs (i.e., representative UE and subordinary UEs) belonging to the UE group to the new MME. In this case, context information of a subordinary UE (e.g., remote UE) may include a user ID of the UE and information on the allocated IP. When the TA of the current cell is not included in the list of TAs previously registered by the UE during the NAS signalling connection establishment, the TAU request message transmitted by the representative UE may include the identifier of the UE group or the identifiers of the UEs belonging to the UE group.

When the individual UEs' context information is stored in different MMEs, the representative UE in the UE group performs the TAU procedure. In this case, the TAU request message may include the identifier of the UE group, the identifiers of the UEs belonging to the UE group, or a prescribed indicator (for example, an indicator for requesting context information of all the UEs belonging to the UE group). The new MME performs a context request procedure to an MME supporting the UEs belonging to the UE group. If there are more than two MMEs supporting the UEs, the new MME performs the context request procedure to each of the MMEs. By doing so, each of the MMEs transmits its UE context information to the new MME. If an MME of a specific UE rather than the representative UE of the UE group needs to handle context information, the MME in charge of the context information may be changed through a redirection procedure performed by an eNB or a direct redirection procedure between MMEs.

Next, a GUTI allocation procedure after the MME change will be explained. When MMEs of UEs belonging to the UE group are changed according to the above-described processes, each MME needs to allocate a new GUTI and transmits the GUTI to each UE. It may be transmitted through a TAU accept message or a newly defined different message. The representative UE needs to be allocated a plurality of GUTIs including GUTIs of other UEs belonging to the UE group, and the new MME may transmit, to the representative UE, a single TAU accept message by including all GUTIs of a plurality of UEs. The message carrying the allocated GUTIs includes not only each UE's identifier but also a mapping relationship between each UE's identifier and each of the allocated GUTIs so that when receiving this message, the representative UE can recognize each UE's GUTI. If MMEs of a plurality of UEs are changed to the same MME, a GUTI may be allocated to a UE without the MME identifier. In other words, an M-TMSI corresponding to each UE's identifier may be transmitted. After receiving a plurality of GUTIs, the representative UE transmits the allocated GUTIs to the UEs through sidelinks.

On the other hand, the new MME may transmit, to each UE, the TAU accept message for allocating the GUTI. Since the message (e.g., TAU accept message) carrying each allocated GUTI includes the identifier of a corresponding UE, the representative UE can recognize each UE's GUTI upon receiving the message. In this case, after receiving a plurality of TAU accept messages, the representative UE transmits newly allocated GUTIs to the individual UEs through sidelinks. Similarly, when MMEs of a plurality of UEs are changed to the same MME, an MME identifier may be excluded from a GUTI.

Hereinafter, the process in which a plurality of UEs form a UE group and the process in which a representative UE is selected will be described again with reference to a ProSe communication process. That is, a case where when a relay UE and a remote UE, which are close to each other, form a UE group, the two UEs belong to different MMEs will be described. In this case, if the two UEs are located at the same position, they may belong to different MMEs. This is because an eNB can form an interface with at least one MME and provides a UE with an MME suitable for the UE through an MME selection function when the UE access the eNB. Another reason is that a dedicated core network (DCN), which includes an MME, SGW, and PGW according to usage type of the UE may be changed based on DCN functionality, and thus, a different DCN may be registered depending on UEs. Further, it is because when the location of a UE is not changed, the UE may belong to a different MME due to load balancing.

The MME alignment process will be described in detail with reference to FIGS. 15 to 17. The MME alignment process, which will be describe later, can be performed with the UE group activation process. For convenience of description, the following assumptions are applied: a relay UE is a representative UE and a remote UE is a UE belonging to a UE group; the remote UE is aligned to an MME to which the relay UE belongs; and the relay UE is served by MME 1 and remote UE is served by MME 2.

FIG. 15 illustrates the MME alignment process initiated by the relay UE. First, the remote UE transmits, to the relay UE, a TAU request message in the form of a PC5 message [S1505]. This PC5 message may correspond to a PC5 signaling message (e.g., a direct communication request message or direct communication accept message used in a direct connection establishment procedure), and it may include an indicator indicating that MME alignment is required. In addition, the TAU request message of the remote UE may be transmitted as itself, or it may be transmitted as a specific IE, parameter, or indicator indicating a TAU request, which is included in the TAU request message. Moreover, the TAU request message includes a GUTI of the remote UE.

After receiving the PC5 message, the relay UE triggers a TAU procedure for the remote UE [S1510]. The relay UE forwards the TAU request message received from the remote UE to MME 1, which corresponds to the registered MME [S1515*c* and S1520]. When the TAU request message of the remote UE is expressed as an IE, parameter, or indicator as described above, the relay UE directly configures the TAU request message of the remote UE and then transmit it to an eNB and MME 1 in step S1520. Specifically, when a TA of the current cell is included in the list of TAs registered by a UE, a NAS layer of the UE transmits an S-TMSI to an AS layer. When the AS layer is provided with the S-TMSI by the NAS layer, the AS layer transmits the S-TMSI to the eNB by including it in RA msg3 [S1515*c*]. On the other hand, when the TA of the current cell is not included in the list of TAs registered by the UE, the NAS layer of the UE transmits a GUMMEI to the AS layer. When receiving the GUMMEI, the AS layer transmits the GUMMEI to the eNB by including it in RA msg5 [S1520]. Meanwhile, upon receiving the TAU request message of the remote UE from the eNB, MME 1 needs to recognize that the corresponding NAS message is made by the remote UE. This is because MME 1 should inform the relay UE that TAU accept/complete messages, which will be described later, will be transmitted to the remote UE. To this end, an indicator informing that the TAU request message is made by the remote UE is required. Such an indicator may be included in a NAS message (e.g., TAU request message) or an RRC message. In the former case, when the remote UE creates the TAU request message, the remote UE may include the corresponding indicator in the TAU request message. Alternatively, the remote UE may include the indicator in the PC5 message rather than the TAU request message and then transmit the indicator to the relay UE. In the latter case, the indicator may be included in an RRC connection setup complete message and an S1-AP message (e.g., initial UE message), which will be transmitted to the eNB, and then transmitted to MME 1.

Based on the information received in step S1515*c* or S1520 (e.g., S-TMSI or MME indicator), the eNB transmits the TAU request message of the remote UE to MME 1, which corresponds to the MME of the relay UE.

Next, when receiving the TAU request message of the remote UE and the indicator indicating that the corresponding TAU request message is made by the remote UE, MME 1 recognizes that the received TAU request message is for the remote UE and then triggers a context request for the remote UE according to the existing TAU procedure [S1530]. Specifically, MME 1 derives the previous MME identifier (GUMMEI) from the GUTI of the remote UE included in the TAU request message and request and receive context information of the remote UE from MME 2, which corresponds to the current MME of the remote UE [S1535 and S1540]. Then, the TAU procedure described in TS 23.401 is sequentially performed by network entities [S1545]. When the TAU procedure is completed, MME 1 transmits the TAU accept message to the relay UE [S1550], and the relay UE transmits the TAU complete message to MME 1 [S1555]. In this case, an indicator indicating that corresponding NAS messages is for the remote UE may be transmitted together. The relay UE forwards the TAU accept message to the remote UE through a PC5 message [S1560].

The relay UE-initiated method described with reference to FIG. 15 is a method in which the relay UE transmits the TAU request message of the remote UE to the network instead of the remote UE. According to this method, the context information of the remote UE is transmitted to the relay UE, and MMEs of the remote UE and relay UE are aligned. Meanwhile, during the existing TAU procedure, a security process, an authentication process, and a GUTI reallocation process may occur between a UE and the network. When these processes are triggered, the network handle handles the processes by interacting with the remote UE through the relay UE.

FIGS. 16 and 17 illustrate MME alignment processes initiated by a remote UE. In particular, FIG. 16 shows an eNB routing method, and FIG. 17 shows an MME re-routing method.

Referring to FIG. 16, a relay UE transmits an S-TMSI of the relay UE or an MME identifier (i.e., GUMMEI) of MME 1 to a remote UE [S1605]. In this case, an indicator capable of extracting the S-TMSI (e.g., GUTI) may be transmitted instead of the S-TMSI of the relay UE or the MME identifier of MME 1. In addition, in the above step, a serving cell ID of the relay UE may also be transmitted to the remote UE together.

By performing a cell reselection procedure in consideration of the serving cell ID of the relay UE received in step S1605, the remote UE aligns its serving cell such that it becomes identical to that of the relay UE. Thereafter, the remote UE triggers a TAU procedure to align its MME with that of the relay UE [S1610].

The remote UE transmits a TAU request message to an MME in which the relay UE is registered in (i.e., MME 1) using the identification information of the relay UE received in step S1605 (e.g., S-TMSI, GUTI, or GUMMEI) [S1615*c* and S1620]. This may be performed in such a manner that a NAS layer of a UE provides an AS layer with the S-TMSI or GUMMEI when a NAS signaling connection is established (for example, when a TAU procedure is performed). Specifically, when a TA of the current cell is included in the list of TAs registered by the UE, the NAS layer of the UE transmits the S-TMSI to the AS layer. In addition, when the AS layer is provided with the S-TMSI by the NAS layer, the AS layer transmits the S-TMSI to the eNB by including it in RA msg3 [S1615*c*]. On the other hand, when the TA of the current cell is not included in the list of TAs registered by the UE, the NAS layer of the UE transmits the GUMMEI to the AS layer. When receiving the GUMMEI, the AS layer transmits the GUMMEI to the eNB by including it in RA msg5 [S1620]. In this case, the S-TMSI or GUMMEI transmitted by the remote UE to the eNB is not a thing made by the remote UE but is the value received from the relay UE in step S1605. That is, the S-TMSI of the relay UE is transmitted to the eNB by being included in the RA msg3, or the GUMMEI of MME 1, which is the MME of the relay UE, is transmitted to the eNB by being included in the RA msg5.

The eNB forwards the TAU request message to identified MME 1 based on the S-TMSI of the relay UE or the MME identifier of MME 1 [S1625], and MME 1 receives context information of the remote UE from MME 2 by triggering a context request procedure of the remote UE [S1630, S1635, and S1640]. Thereafter, the TAU procedure described in TS 23.401 is sequentially performed by network entities [S1645]. When the TAU procedure is completed, MME 1 transmits a TAU accept message to the remote UE [S1650], and the remote UE transmits a TAU complete message to MME 1 [S1655].

Referring to FIG. 17, a relay UE transmits identification information (e.g., GUMMEI) of MME 1 to a remote UE through a PC5 message [S1705]. In this case, an identifier (e.g., GUTI) capable of extracting the MME identifier may be transmitted instead of the MME identifier. The remote UE triggers a TAU procedure based on the PC5 message received from the relay UE [S1710]. The remote UE forwards, to the network (MME 2) the GUMMEI of MME 1, which is an MME of the relay UE, received in step S1705 by including it in a TAU request message [S1720]. In this case, the TAU request message may additionally include an indicator for triggering MME re-routing.

Thereafter, eNB 1 forwards the TAU request message to an MME of the remote UE, MME 2 [S1725]. In this case, the TAU request message may include an indicator indicating MME re-routing together with the identifier of MME 1. When receiving the TAU request message and checking the identifier of MME 1 (or the indicator indicating MME re-routing), MME 2 decides to re-route the TAU request message and then triggers a TAU procedure for re-routing to MME 1 [S1730]. Then, MME 2 transmits, to the eNB, the identifier of MME 1 together with the TAU request message by including the identifier in an S1AP message for the purpose of MME re-routing [S1735]. After receiving the S1AP message, the eNB checks MME 1 based on the identifier of MME 1 included in the S1AP message [S1740] and then transmits the TAU request message to MME 1 [S1745]. To align the MME of the remote UE, MME 1 requests context information of the remote UE from MME 2 and then receive a response [S1750 and S1755]. The remaining TAU procedure may be applied in a similar manner as steps S1645 to 1655 described in FIG. 16.

5. Device Configurations

Figure 18:
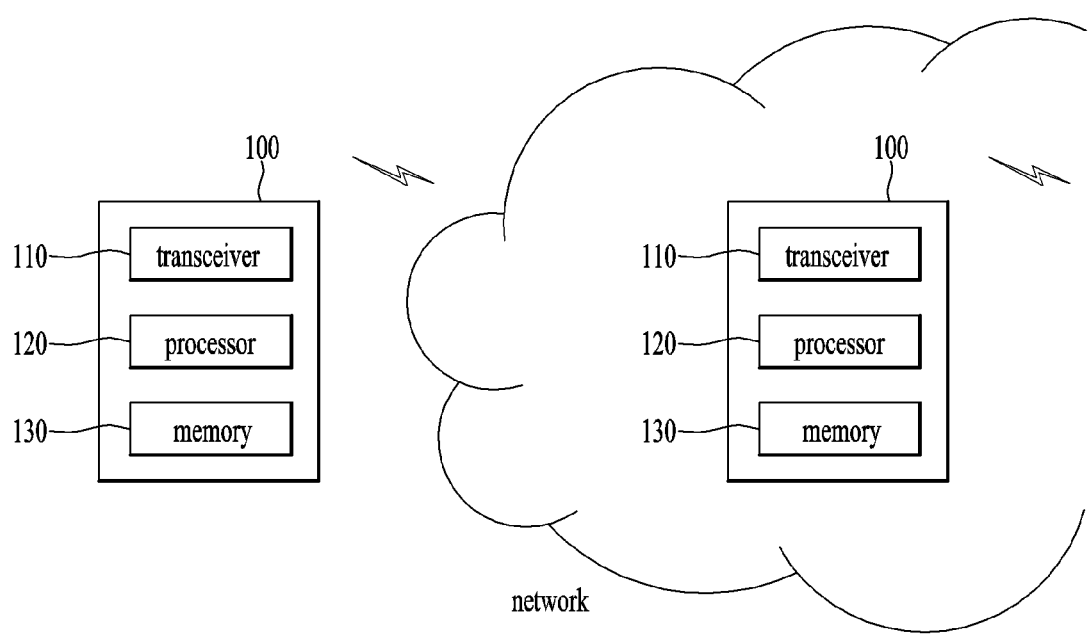
FIG. 18 is a diagram illustrating the configuration of a node device according to a proposed embodiment.

FIG. 18 is a diagram illustrating configurations of node devices according to a proposed embodiment.

A user equipment (UE) 100 may include a transceiver 110, a processor 120, and a memory 130. The transceiver 110 may be configured to transmit and receive various signals, data, and information to/from an external device. Alternatively, the transceiver 110 may be implemented with a combination of a transmitter and a receiver. The UE 100 may be connected to the external device by wire and/or wirelessly. The processor 120 may be configured to control overall operations of the UE 100 and process information to be transmitted and received between the UE 100 and the external device. Moreover, the processor 120 may be configured to perform the UE operation proposed in the present invention. The memory 130, which may be replaced with an element such as a buffer (not shown in the drawing), may store the processed information for a predetermined time.

Referring to FIG. 18, a network node 200 according to the present invention may include a transceiver 210, a processor 220, and a memory 230. The transceiver 210 may be configured to transmit and receive various signals, data, and information to/from an external device. The network node 200 may be connected to the external device by wire and/or wirelessly. The processor 220 may be configured to control overall operations of the network node 200 and process information to be transmitted and received between the network node device 200 and the external device. Moreover, the processor 220 may be configured to perform the network node operation proposed in the present invention. The memory 230, which may be replaced with an element such as a buffer (not shown in the drawing), may store the processed information for a predetermined time.

The specific configurations of the UE 100 and the network node 200 may be implemented such that the aforementioned various embodiments of the present invention can be independently applied, or two or more embodiments can be simultaneously applied. For clarity, redundant description will be omitted.

The embodiments of the present invention may be implemented using various means. For instance, the embodiments of the present invention may be implemented using hardware, firmware, software and/or any combinations thereof.

In case of the implementation by hardware, a method according to each embodiment of the present invention may be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code may be stored in a memory unit and be then executed by a processor. The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Therefore, the present invention is non-limited by the embodiments disclosed herein but intends to give a broadest scope matching the principles and new features disclosed herein.

INDUSTRIAL APPLICABILITY

The aforementioned direct communication method can be applied to not only the 3GPP system but also various wireless communication systems including an IEEE 802.16x system and IEEE 802.11x system. Further, the proposed method can also be applied to an mmWave communication system using super-high frequency band.

What is claimed is:

1. A method performed by a mobility management entity (MME), presently associated with a relay user equipment (UE), supporting a tracking area update (TAU) procedure in a wireless communication system, the method comprising:
receiving a TAU request message from the relay UE, which is connected with one or more remote UEs;
transmitting a context request message to an MME previously associated with the relay UE, based on the TAU procedure; and
when (i) the one or more remote UEs communicate with a network via the relay UE, and (ii) the one or more remote UEs receive relay traffic from the relay UE based on a packet data network (PDN) connection only used for the relay traffic, receiving a context response message comprising UE context information for both the relay UE and the one or more remote UEs from the MME previously associated with the remote UE, in response to the context request message.

2. The method of claim 1, wherein the TAU request message comprises a group identity of a group comprising the relay UE and the one or more remote UEs or identities of each UE that belongs to the group.

3. The method of claim 1, wherein the context request message is transmitted with information for requesting transmission of the UE context corresponding to the relay UE and the one or more remote UEs.

4. A method performed by a mobility management entity (MME), previously associated with a relay user equipment (UE), supporting a tracking area update (TAU) procedure in a wireless communication system, the method comprising:
receiving a context request message from a MME presently associated with the relay UE, which is connected with one or more remote UEs, based on the TAU procedure; and
when (i) the one or more remote UEs communicate with a network via the relay UE, and (ii) the one or more remote receive relay traffic from the relay UE based on a packet data network (PDN) connection only used for the relay traffic, transmitting a context response message comprising UE context information for both the relay UE and the one or more remote UEs to the MME presently associated with the remote UE, in response to the context request message.

5. The method of claim 4, wherein the context request message is received with information for requesting transmission of the UE context corresponding to the relay UE and the one or more remote UEs.

6. A mobility management entity (MME), presently associated with a relay user equipment (UE), supporting a tracking area update (TAU) procedure in a wireless communication system, the MME comprising:
a transmitter;
a receiver; and
a processor, operatively connected to the transmitter and the receiver,
wherein the processor:
controls the receiver to receive a TAU request message from the relay UE which is connected with one or more remote UEs;
controls the transmitter to transmit a context request message to a MME previously associated with the relay UE, based on the TAU procedure; and
when (i) the one or more remote UEs communicate with a network via the relay UE, and (ii) the one or more remote UEs receive relay traffic from the relay UE based on a packet data network (PDN) connection only used for the relay traffic, controlling the receiver to receive a context response message comprising UE context information for both the relay UE and the one or more remote UEs from the MME previously associated with the remote UE, in response to the context request message.

7. The new MME of claim 6, wherein the TAU request message comprises a group identity of a group comprising the relay UE and the one or more remote UEs or identities of each UE that belongs to the group.

8. The new MME of claim 6, wherein the context request message is transmitted with information for requesting transmission of the UE context corresponding to the relay UE and the one or more remote UEs.

9. A mobility management entity (MME), previously associated with a relay user equipment (UE), supporting a tracking area update (TAU) procedure in a wireless communication system, the old MME comprising:
a transmitter;
a receiver; and
a processor operatively connected to the transmitter and the receiver,
wherein the processor:
controls the receiver to receive a context request message from a MME presently associated with the relay UE which is connected with one or more remote UEs, based on the TAU procedure; and
when (i) the one or more remote UEs communicate with a network via the relay UE, and (ii) the one or more remote UEs receive relay traffic from the relay UE based on a packet data network (PDN) connection only used for the relay traffic, controls the transmitter to transmit a context response message comprising UE context information for both the relay UE and the one or more remote UEs to the MME presently associated with the remote UE, in response to the context request message.

10. The old MME of claim 9, wherein the context request message is received with information for requesting transmission of the UE context corresponding to the relay UE and the one or more remote UEs.

* * * * *